United States Patent
Akbar et al.

(10) Patent No.: US 10,640,387 B2
(45) Date of Patent: *May 5, 2020

(54) METHODS TO INCREASE CRUSH RESISTANCE OF SILICA SAND PROPPANT FOR FRACKING OPERATIONS

(71) Applicant: FORECASTER CHEMICALS, LLC, Bellaire, TX (US)

(72) Inventors: Syed Akbar, Bellaire, TX (US); Jared Rose, Bellaire, TX (US)

(73) Assignee: FORECASTER CHEMICALS, LLC, Bellaire, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,287

(22) Filed: Jul. 29, 2019

(65) Prior Publication Data

US 2019/0389730 A1    Dec. 26, 2019

Related U.S. Application Data

(60) Continuation of application No. 16/276,910, filed on Feb. 15, 2019, now Pat. No. 10,414,662, which is a
(Continued)

(51) Int. Cl.
*C01B 33/18* (2006.01)
*B02C 25/00* (2006.01)
(Continued)

(52) U.S. Cl.
CPC ............ *C01B 33/18* (2013.01); *B02C 17/183* (2013.01); *B02C 25/00* (2013.01); *C09K 8/80* (2013.01); *C01P 2002/82* (2013.01)

(58) Field of Classification Search
CPC combination set(s) only.
See application file for complete search history.

(56) References Cited

U.S. PATENT DOCUMENTS

| 2,891,844 A | 6/1959 | William |
| 2,952,516 A | 9/1960 | Gross |
(Continued)

FOREIGN PATENT DOCUMENTS

CN    105417548    3/2016

OTHER PUBLICATIONS

Benson, Mary Ellen et al., Frac Sand in the United States—A Geological and Industry Overview, U.S. Department of the Interior, U.S. Geological Survey, Open-File Report 2015-1107, pp. 6, 20 and 23. https://pubs.usgs.gov/of/2015/1107/pdf/ofr20151107.pdf.
(Continued)

*Primary Examiner* — Erin F Bergner
(74) *Attorney, Agent, or Firm* — Womble Bond Dickinson (US) LLP

(57) ABSTRACT

Methods for cost effectively transforming lower quality silica sands into higher quality silica sands having increased crush resistance for use as proppants in fracturing operations involving subterranean hydrocarbon formations. One or more of an attrition process, a microwaving process and a tumbling process are disclosed and shown to be applied to silica sands having inferior physical properties in order to increase the performance of those silica sands as proppants in hydrocarbon formation fracturing operations.

20 Claims, 14 Drawing Sheets

Related U.S. Application Data division of application No. 16/144,654, filed on Sep. 27, 2018, now Pat. No. 10,364,154.

(60) Provisional application No. 62/690,073, filed on Jun. 26, 2018.

(51) Int. Cl.
*C09K 8/80* (2006.01)
*B02C 17/18* (2006.01)

(56) References Cited

U.S. PATENT DOCUMENTS

| | | | |
|---|---|---|---|
| 4,859,493 | A | 8/1989 | Lemelson |
| 10,364,154 | B1 | 7/2019 | Akbar et al. |
| 10,414,662 | B1 | 9/2019 | Akbar et al. |
| 2008/0020207 | A1 | 1/2008 | Hashiba et al. |
| 2008/0135245 | A1 | 6/2008 | Smith et al. |
| 2010/0197532 | A1 | 8/2010 | Rush et al. |

OTHER PUBLICATIONS

Industrial Minerals and Their Uses, A Handbook & Formulary, Copyright 1996 by Noyes Publications, Westwood, New Jersey, pp. 58-62.
International Search Report and Written Opinion for PCT/US19/36879, dated Aug. 30, 2019.

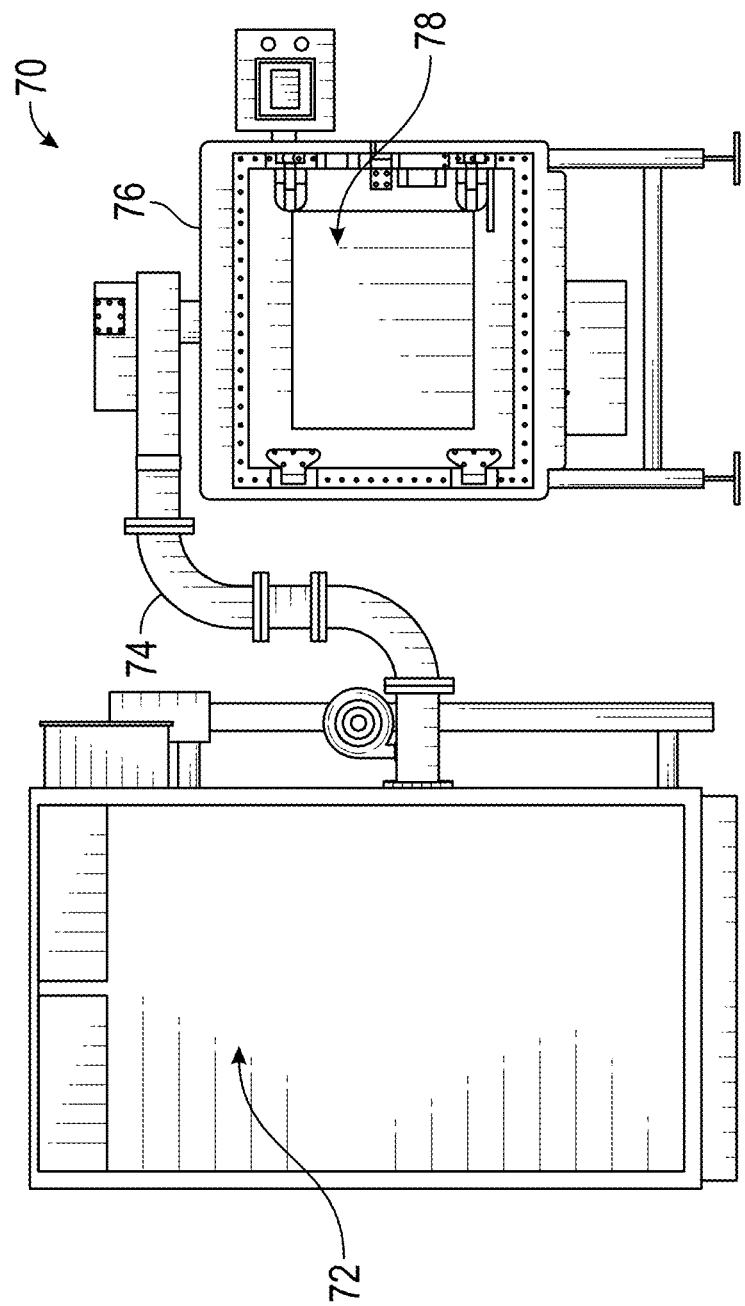

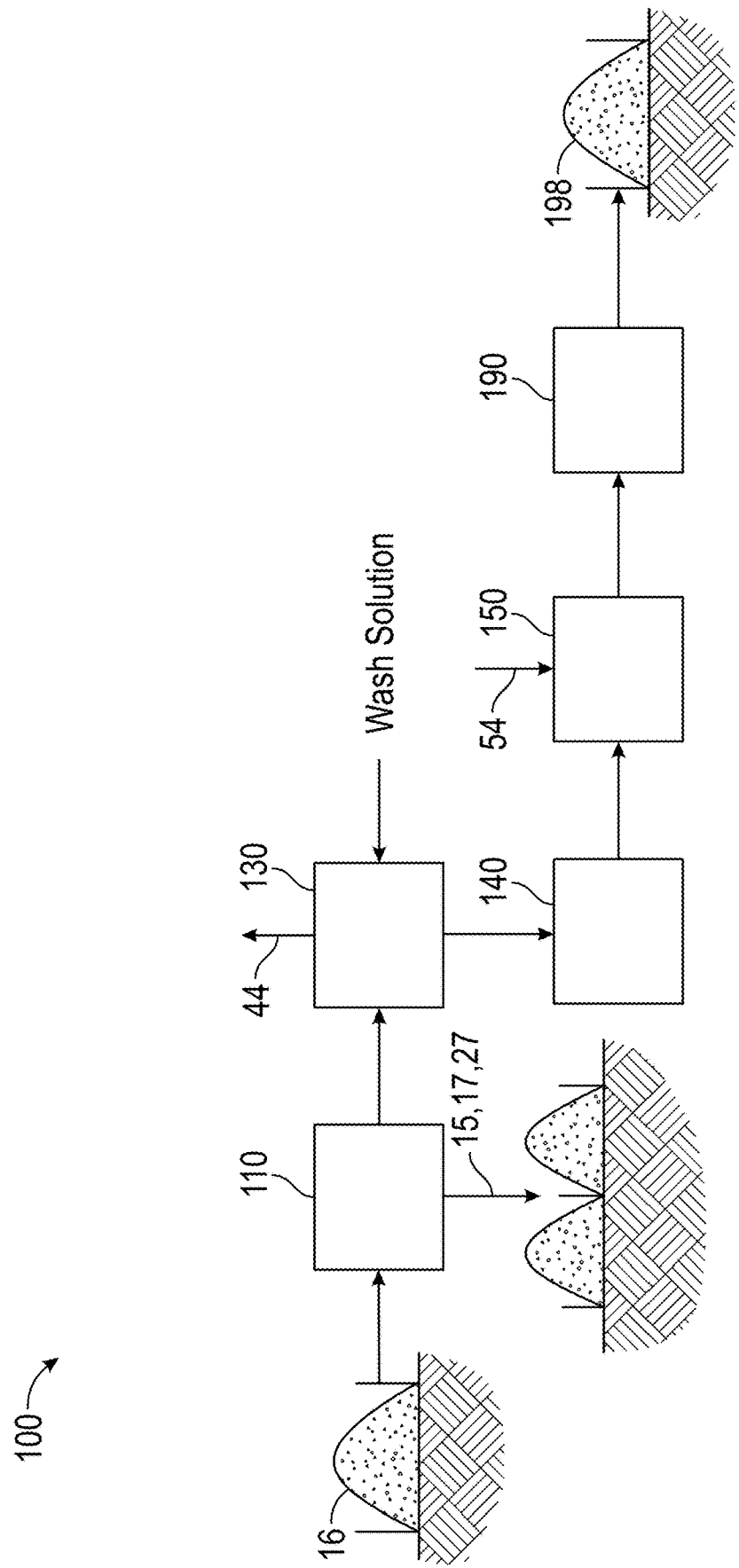

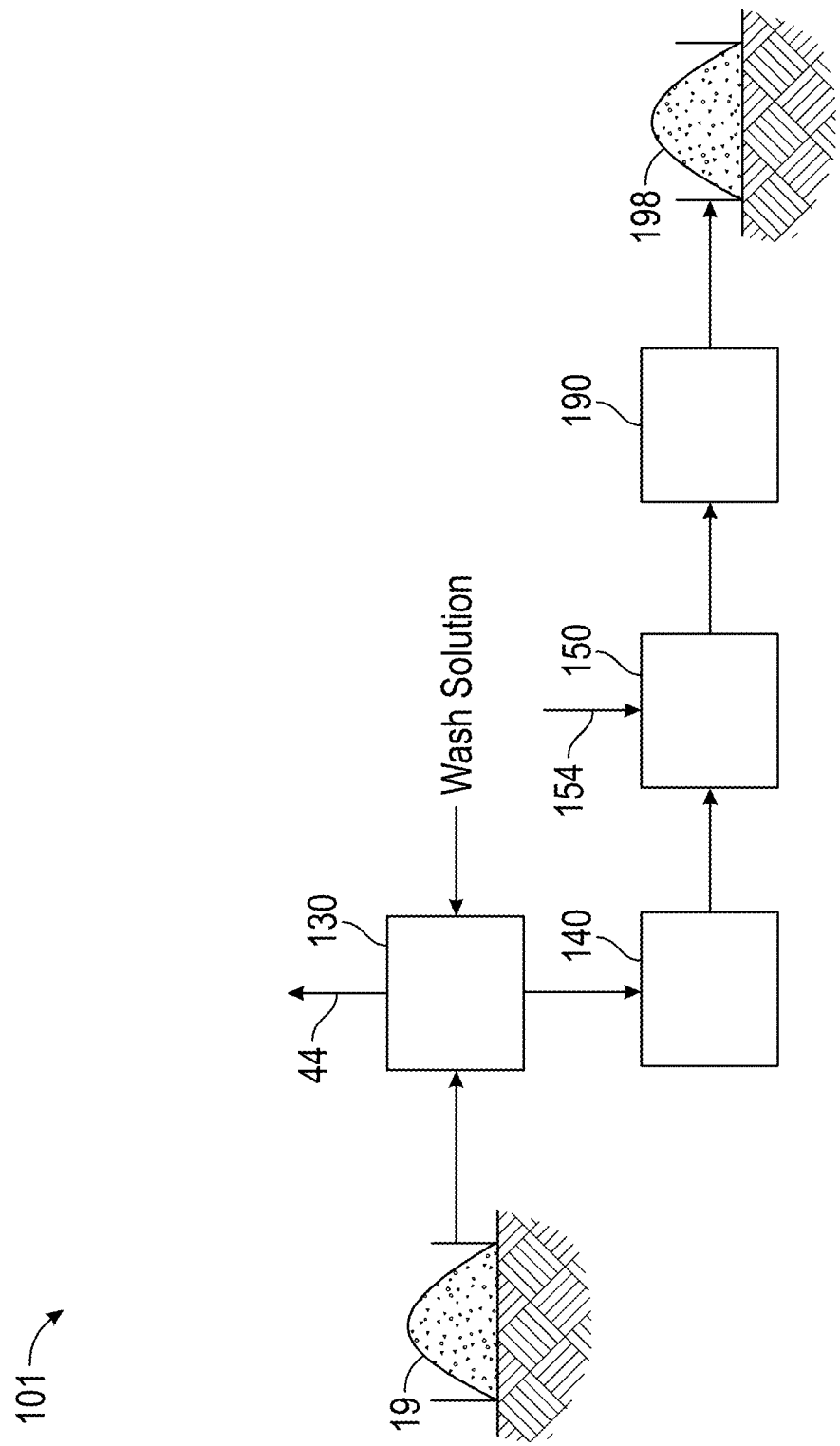

METHODS TO INCREASE CRUSH RESISTANCE OF SILICA SAND PROPPANT FOR FRACKING OPERATIONS

RELATED APPLICATIONS

This application is a continuation, and claims priority to and the benefit of U.S. Non-Provisional patent application Ser. No. 16/276,910, filed Feb. 15, 2019, titled "SYSTEMS AND METHODS TO STRENGTHEN SAND PROPPANT," which is a divisional of U.S. Non-Provisional patent application Ser. No. 16/144,654, filed Sep. 27, 2018, titled "SYSTEMS AND METHODS TO STRENGTHEN SAND PROPPANT," now U.S. Pat. No. 10,364,154, issued Jul. 30, 2019, which claims priority to and the benefit of U.S. Provisional Patent Application No. 62/690,073, filed Jun. 26, 2018, titled "SYSTEMS AND METHODS TO STRENGTHEN SAND PROPPANT," the full disclosure of which is hereby incorporated herein by reference in its entirety.

FIELD OF INVENTION

Embodiments relate to enhancing crush resistance and/or conductivity of silica sand used as proppant in fractured subterranean formations for hydrocarbon completions.

BACKGROUND

Frac sand is generally high-purity quartz sand that is added to fracking fluids used in subterranean hydrocarbon completions. The fracking fluids along with the frac sand are injected under pressure into oil and gas wells during the process of hydraulic fracturing or fracking. The high pressure of the fracking fluids on the subterranean hydrocarbon formation causes fractures of the hydrocarbon formation through which the fracking fluids travel carrying the frac sand. The frac sand settles out of the fracking fluid within the fractures and prevents the fractures from closing when fracking fluid pressure dissipates. The fractures, held open by the frac sand, provide hydrocarbons within the subterranean formation a fluid pathway to the oil and/or gas well for production to the surface.

The oil and gas industry has placed heavy emphasis on best-in-class frac sand as being the primary proppant used in unconventional oil and gas well completions. For example, billions of dollars of development capital have been spent on mining and logistics infrastructure to transport superior sand from various regions of the United States to the hydrocarbon producing basins in the United States. The principle sources of preferred sands in the United States, for example, come from the upper Midwest of the United States, such as Wisconsin, and must be shipped by truck or rail to oil and gas plays in Texas, Oklahoma and North Dakota.

With the decrease in hydrocarbon prices in recent years, alternatives to the transportation and logistics of moving Northern White or Ottawa sand from the upper Midwest have been considered to maintain oil and gas margins. Resin coated sands and ceramics offer an alternative to raw quartz sand but at a higher cost than the transportation of Northern White and Ottawa raw sands. Therefore, raw sands from the upper Midwest continue to make up the majority of the proppant market. Many companies have recently invested in west Texas dune sand mines, for example, as a lower cost alternative to such transportation. While less costly transportation and logistics costs of west Texas sands provide strong economic incentives, Applicants recognized that the quality of such sands is questionable.

Applicants also recognized, for example, that under harsh conditions, hydraulic fracturing propping agents, or proppants, such as frac sand, are subject to variables that diminish their effectiveness in ensuring hydrocarbon flow passages and hydrocarbon flow velocity. A desired characteristic of the sand proppants is to be able to withstand high physical pressures such that, when the fracking fluid pressure in the fractures is reduced, the resettling of the formation does not crush the frac sand, thereby closing the fractures and, thus, the fluid pathway for the formation hydrocarbons to travel to surface via the well.

SUMMARY

Applicants recognized that superior results are achieved by deploying a sand proppant that has the highest compressive strength and crush resistance while remaining economically feasible. Applicants also recognized that roundness of frac sand particles is one characteristic that governs this degree of crushability. Frac sand particles that have greater roundness tend to withstand greater physical pressures prior to being crushed, or being broken into fines. Applicants further recognized that another characteristic of frac sand that affects crush resistance is the frac sand's content of high-strength alpha-quartz. Higher alpha-quartz content has been associated with greater degrees of crush resistance. Furthermore, Applicants recognized that sands having a higher crush resistance tend to have a higher conductivity, or permeability, which facilitates oil and gas production between the frac sand particles used as proppant in fractured hydrocarbon formations.

Thus, embodiments of systems and methods to enhance crush resistance and conductivity of lower quality sands found closer to hydrocarbon producing formations and to compete economically with the transportation and logistics costs, for example, of upper Midwest frac sands, are desired and herein provided. In one or more implementations, silica sand is strengthened and its crush resistance and conductivity enhanced through one or more processes of attrition, radiation exposure and tumbling. Thus, through one or more of these processes, a poor quality sand that may not be ideal for use as frac sand may be structurally transformed into a higher quality sand with individual sand grains that have higher specific gravities and are more round and/or spherical, e.g., have less angularity.

In an attrition process, according to one or more embodiments, poorer quality sand may be washed with an acid solution to remove any non-silicon dioxide impurities, thereby increasing the overall percentage of silicon dioxide in the sand. In a radiation exposure process, according to one or more embodiments, the washed sand is exposed to microwave electromagnetic radiation to heat the individual sand particles. The addition of heat to the individual sand particles may weaken any bonding between the silicon dioxide molecules and impurities while permitting the strengthening of silicon dioxide molecule bonding. In a tumbling process, according to one or more embodiments, the microwave-treated sand is tumbled soon after the microwaving process and while such sand is still at a temperature above the ambient temperature. The individual sand grains, while at such an elevated temperature, may be easier to mold or shape into more round or spherical particles, having less angularity, through the physical striking of the individual sand grains against each other and the inner walls of the tumbler. Thus, by one or more of these processes, the individual sand grains may be made to have physical characteristics more like those in higher quality frac sands having a higher alpha-quartz crystallography.

An embodiment of a method of increasing the crush resistance of silica sand proppant used in fracturing operations involving one or more subterranean hydrocarbon formations, for example, includes washing silica sand proppant in a washer to remove impurities and exposing at least a portion of the washed silica sand proppant to electromagnetic radiation to impart heat thereto. The electromagnetic radiation, for example, may be generated from a local electromagnetic radiation source and may have a frequency of between about 300 MHz and about 300 GHz. An embodiment of a method of increasing crush resistance of silica sand proppant may also include tumbling the silica sand proppant in a sand tumbler within a preselected period of time after exposure to the electromagnetic radiation.

An embodiment of a system to increase the crush resistance of silica sand proppant used in fracturing operations involving one or more subterranean hydrocarbon formations, for example, includes a washer having a cavity to receive silica sand proppant and a wash solution, the washer having an agitator to agitate the silica sand proppant and the wash water. The wash solution includes an acidic solution. An embodiment of the system also includes a microwave device having an interior chamber positioned within an outer housing. The interior chamber is positioned to receive and maintain the washed silica sand proppant therein for a preselected microwave exposure time. The microwave device also may have a local radiation emitting source that emits electromagnetic radiation into the interior chamber at a frequency of between about 300 MHz and about 300 GHz. An embodiment of the system also may include a tumbler positioned to be rotated upon an axis thereof at a preselected rate of rotations per minute. The tumbler, for example, may have a barrel positioned to receive the silica sand proppant from the microwave device.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the disclosure's scope.

FIG. 4 is a schematic diagram of a microwaving system that may be used to expose washed silica sand to microwave electromagnetic radiation on a batch basis according to an embodiment of the disclosure.

FIG. 5A is such Raman spectroscopy response of Sand 1, FIG. 5B is such Raman spectroscopy response of Sand 2, FIG. 5C is such Raman spectroscopy response of Sand 3, FIG. 5D is such Raman spectroscopy response of Sand 4, and FIG. 5E is such Raman spectroscopy response of Sand 5.

FIG. 8A is a schematic flow diagram illustrating an embodiment of an arrangement to strengthen sand proppant, which includes a sand screening process, an attrition process, a drying process, a microwaving process, and a tumbling process.

FIG. 8B is a schematic flow diagram illustrating another embodiment of an arrangement to strengthen sand proppant, which includes an attrition process, a drying process, a microwaving process, and a tumbling process.

DETAILED DESCRIPTION

So that the manner in which the features and advantages of the embodiments of the systems and methods disclosed herein, as well as others, which will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the embodiments of the systems and methods disclosed herein and are therefore not to be considered limiting of the scope of the systems and methods disclosed herein as it may include other effective embodiments as well.

In one or more embodiments, systems and methods of increasing crush resistance of silica sand, e.g., sand proppant used in well fracking, are disclosed. Further, in one or more embodiments, systems and methods of enhancing the fracture conductivity of silica sand are disclosed. Such systems and methods strengthen the silica sand particle through a crystallography change and/or by making sand grains more round through one or more of the processes of attrition, radiation exposure, and tumbling.

With extremely high quality white sand, such as those found in the upper Midwest of the United States, the weight percent of silicon dioxide ($SiO_2$) to the total weight of the sand may be as high as about 99.5%. For sands with lower quartz content than typical northern white sands found in the St. Peters or Jordan formations in the Northern United States, such as west Texas brown sand, however, the weight percent of silicon dioxide may be more on the order of about 96%, with the balance being up to about 3% aluminum oxide ($Al_2O_3$) and up to about 1% other carbonates and/or oxides, e.g., calcium carbonate ($CaCO_3$), magnesium carbonate ($MgCO_3$), iron oxide ($Fe_2O_3$), among others. Thus, depending on the geographical origin of a particular sand, its weight percent composition may be from 96% to 98% $SiO_2$, 1% to 3% $Al_2O_3$, and the remaining approximately 1% being other oxides and/or carbonates.

Screening Process

Raw sand can be sorted through a screening process to divide the sand by particle size ranges. Screened sands are classified by their particle size ranges, e.g., 20/40, 40/60, etc., where the numbers identify the mesh sizes and increasing mesh sizes represent smaller openings. For example, a 20/40 sand indicates that 90% of the sand particles therein should be retained by screens having mesh sizes between 20 and 40. Sand that has been sorted by sand particle size has been found to improve the effect of the attrition, microwaving and tumbling processes, described in greater detail hereinafter, because the sorted sand particles are uniform in size range.

Figure 1:
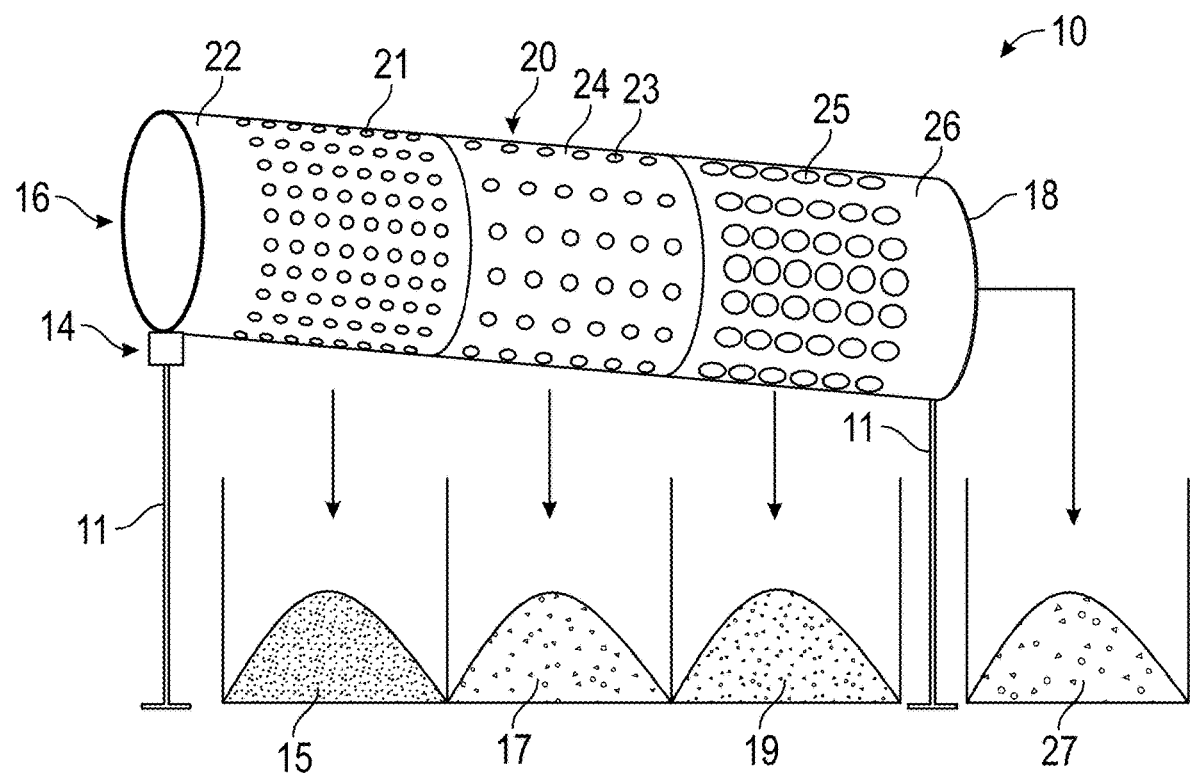
FIG. 1 is a schematic diagram of a sand sorting apparatus according to one or more embodiments of the disclosure having a trommel screen that may be used to segregate the various sizes of sand.

FIG. 1 shows an embodiment of a trommel barrel sand screening apparatus 10 that may be used to sort sand by mesh size. The raw sand feed 16 is placed into one end portion of the trommel barrel 20, which is rotated by a motor 14 positioned to rotate the trommel barrel 20 at a variable speed. As illustrated, motor 14 is positioned proximate the entrance end portion of the trommel barrel 20, both of which are supported by support member 11. The raw sand feed 16, upon entering the trammel barrel 20, is rotated and moved gradually downwardly through the trommel barrel 20 via gravity and assisted by the rotation. Openings 21 in a first section 22 of the trommel barrel 20 are relatively small, such that sand fines pass therethrough and fall into a designated fines container 15. Larger sand grains continue to move downwardly through the trommel barrel 20 and into the next section 24 thereof. The openings 23 in this section 24 are larger than the openings 21 of the previous section 22, such that larger sand grains pass therethrough and into the designated container 17. As shown, the openings 23 are sized at 40 mesh, which indicates that sand grains smaller than 40 mesh will pass therethrough and into the container 17. Larger sand grains continue to move downwardly through the trommel barrel 20 and into the next section 26 thereof. The openings 25 in this section 26 are larger than the openings 21, 23 of the previous sections 22, 24, such that larger sand grains pass therethrough and into the designated container 19. As shown, the openings 25 are sized at 20 mesh, which indicates that sand grains between 20 mesh and 40 mesh will pass therethrough and into the designated container 19. The sand of container 19 is thus 20/40 mesh sorted sand. Larger sand grains continue to move downwardly through the trommel barrel 20 and into subsequent sections (not shown) having openings of larger mesh size. Eventually, any remaining large grain sand particles flow out of an end portion 18 of the trommel barrel 20 and into a designed oversize container 27.

Attrition Process

In one or more embodiments, an attrition process is first used to eliminate as much of the non-silicon dioxide impurities as possible. The attrition process involves washing the sand with a wash solution, such as water and/or an ammonium chloride ($NH_4Cl$) solution, to remove up to about 3% $Al_2O_3$ and lesser amounts of $CaCO_3$, $MgCO_3$, and/or $Fe_2O_3$ from the sand, thereby leaving a greater concentration of silicon dioxide. The ammonium chloride solution may have a weight percent concentration of $NH_4Cl$ in water of between about 2% and about 20%, between about 5% and about 15%, between about 7.5% and about 12.5%, or any percentage in between those ranges. The ammonium chloride solution is acidic and forms a mild hydrochloric acid. The acid effectively acid washes the sand, whereby the acid reacts with non-$SiO_2$ impurities to create water-soluble compounds that may be washed away and removed from the remaining silicon dioxide. The effectiveness of the attrition process is measured by comparison of chemical analyses of sand samples that have undergone the attrition process and those analogous sand samples that have not.

Although ammonium chloride is effectively used in the attrition process, those skilled in the art will recognize that other mild acids, e.g., hydrochloric, phosphoric, etc. may be equally employed in place of or in addition to the ammonium chloride solution. Additionally, a tetrahydrofuran ($C_4H_8O$) solution may be used, if desired, as an organic removal agent to remove any organics from the sand. Thus, the attrition process seeks to increase the percentage of silicon dioxide in the sand by removing any and all non-$SiO_2$ impurities whether organic or inorganic.

Figure 2:
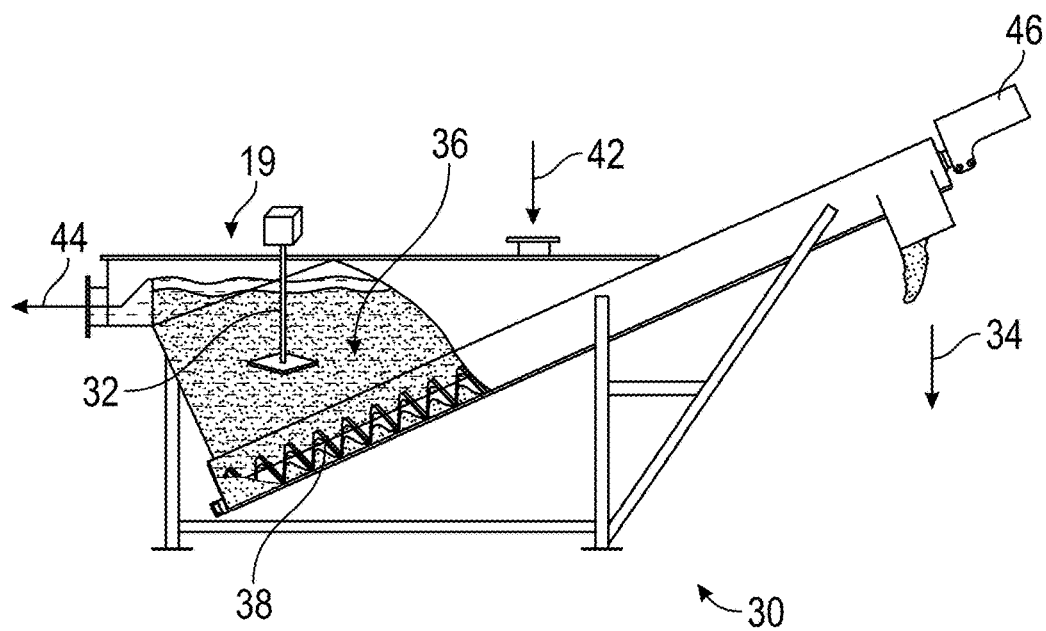
FIG. 2 is a schematic diagram of an apparatus that may be used to wash raw silica sand in order to remove non-silicon dioxide impurities in an attrition process according to an embodiment of the disclosure.

FIG. 2 illustrates an embodiment of an apparatus 30 that may be used in an attrition process. As shown, the sorted sand 19 is placed in a washer 36, e.g., vessel, tank, holding cavity of a screw washer, etc., either by conveyor or by direct placement, such as by front end loader. The water and/or acid solution 42 is added to the washer 36 containing the sand 19 through piping. The water and/or acid solution 42 is subjected to mild to slightly aggressive agitation by a mixing blade or other agitator 32 for a period of about fifteen minutes. In one or more embodiments, such agitation may be for a preselected time and/or be for a period of about 10 to about 20 minutes, for about 5 to about 25 minutes or any period of time therebetween. Thereafter, the spent water and/or acid solution 44 is decanted from the washer 36, e.g., via an overflow drain. Optionally, fresh water is added to the washer and the sand/fresh water mixture is agitated to further wash the treated sand. After such fresh water rinse, the water is similarly decanted from the washer 36. The sand is removed from the washer 36, e.g., by a screw separator 38 rotated by a motor 46, which offloads the sand 34 onto a conveyor or into a holding vessel (not shown). In one or more embodiments, the conveyer with the sand thereon may be passed through a dryer where any remaining water/moisture in the sand may be evaporated with added heat. Alternatively, or additionally, the sand may be permitted to air dry.

Example 1

In an example of the attrition process, 80 grams of sand were added to 130 ml of a 10% ammonium chloride solution in a beaker. The sand and ammonium chloride solution were mixed by a mechanical blade mixer at a rate of 300 rpm for approximately 15 minutes. The ammonium chloride solution was then decanted from the sand sediment in the beaker. The sand was dried by exposure to air for about 8 hours. However, the drying time could have been reduced by subjecting the sand to temperatures of between about 120° F. and about 135° F. As will be understood by those skilled in the art, tetrahydrofuran, for example, was not used during the attrition process to remove any organics present.

Five different sand samples and a control sample, as will be understood by those skilled in the art, were treated through this attrition process: Sand 1 is 20/40 "brown sand"

from west Texas; Sand 2 is 20/40 low-quartz, angular sand obtained from Gansu Provence, China; Sand 3 is a 20/40 low-quartz, dune sand obtained from Michigan; Sand 4 is a 20/40 high-quartz, "white sand" with fractures obtained from Ohio; and Sand 5 is a 20/40 high-quartz, high strength "Jordon white sand." The control sand, labeled as Control, is a sample of the same high-quartz, high strength "Jordan white sand" as Sand 5 that remained untreated by the attrition process. All sand samples were sieve matched to the same sieve distribution to avoid any biased due to sieve distribution. Sieve distribution was conducted according to ISO 13503-2 and API RP 19C.

TABLE 1 shows the percentage compositions of Sands 1 through 5 and the Control before Sands 1 through 5 were treated through the aforementioned attrition process.

TABLE 1

| Sample # | SiO2 (%) | Al2O3 (%) | Fe2O3 (%) | Na2O (%) | K2O (%) | CaO (%) | MgO (%) | Organic (%) |
|---|---|---|---|---|---|---|---|---|
| Sand 1 | 96.55 | 1.66 | 0.16 | 0.25 | 0.91 | 0.13 | 0.07 | 0.26 |
| Sand 2 | 96.44 | 1.82 | 0.18 | 0.29 | 0.94 | 0.06 | 0.08 | 0.18 |
| Sand 3 | 96.59 | 1.75 | 0.18 | 0.28 | 0.86 | 0.06 | 0.08 | 0.19 |
| Sand 4 | 98.46 | 1.04 | 0.02 | 0.00 | 0.01 | 0.15 | 0.19 | 0.13 |
| Sand 5 | 99.12 | 0.60 | 0.00 | 0.00 | 0.02 | 0.18 | 0.05 | 0.03 |
| Control | 99.12 | 0.60 | 0.00 | 0.00 | 0.02 | 0.18 | 0.05 | 0.03 |

TABLE 2 shows the percentage compositions of Sands 1 through 5 and the Control after Sands 1 through 5 were treated according to the example attrition procedure.

TABLE 2

| Sample # | SiO2 (%) | Al2O3 (%) | Fe2O3 (%) | Na2O (%) | K2O (%) | CaO (%) | MgO (%) | Organic (%) |
|---|---|---|---|---|---|---|---|---|
| Sand 1 | 97.4 | 1.54 | 0.21 | 0.12 | 0.34 | 0.05 | 0.02 | 0.32 |
| Sand 2 | 97.58 | 1.34 | 0.22 | 0.11 | 0.41 | 0.02 | 0.01 | 0.31 |
| Sand 3 | 97.45 | 1.43 | 0.21 | 0.11 | 0.44 | 0.05 | 0.02 | 0.29 |
| Sand 4 | 99.16 | 0.59 | 0.04 | 0.0 | 0.0 | 0.03 | 0.02 | 0.16 |
| Sand 5 | 99.63 | 0.31 | 0.00 | 0.00 | 0.00 | 0.00 | 0.00 | 0.06 |
| Control | 99.12 | 0.60 | 0.00 | 0.00 | 0.02 | 0.18 | 0.05 | 0.03 |

As shown in TABLE 2, all five of the sands, Sands 1 through 5, had their percentage by weight of silicon dioxide increase as a result of the attrition process, relative to their respective pre-treatment percentages. Conversely, the relative percentages of oxide and carbonate impurities decreased when pre- and post-treatment percentages are compared for each of Sands 1 through 5. The relative increase in the percentage of organics between pre- and post-treatment of Sands 1 through 5 shows that the ammonium chloride solution had little if any effect on removal of the organic compounds present. Thus, treatment of the Sands 1 through 5 with tetrahydrofuran to remove the organics, which was not done in this Example 1, may further increase the percentage of silicon dioxide in the sands relative to remaining impurities. As would be expected, the Control sand did not see any relative change in percentage silicon dioxide or impurities because the Control sand did not undergo the attrition process.

A comparison of TABLE 1 and TABLE 2 also shows that the disclosed attrition process retains much of the aluminum oxide, such that the percentage of aluminum oxide is only slightly reduced as compared to the other oxides and carbonates. An attrition process that can retain aluminum oxide ($Al_2O_3$), but eliminate other non-silicon dioxide impurities, may have a synergistic strengthening effect on the silica sand during the microwaving process. Aluminum oxide is oxygen rich and, during the microwaving process, may share oxygen atoms with silicon atoms to achieve an enhanced alpha quartz or alpha quartz-like structure. Aluminum oxide also adds to the density of, and imparts bauxite-like strength to, silica. For example, sintered bauxite, or corundum (crystalline aluminum oxide), has a Mohs scale hardness of 9 whereas that of quartz is 7.

Microwave Process

In one or more embodiments, a microwaving process is used to expose the quartz in the silica sand to microwave radiation in the frequency range of between 300 MHz and 300 GHz; with wavelengths ranging from one meter to one millimeter. After the attrition process, the silica sand is exposed to microwaves having frequencies and wavelengths in the aforementioned range. In one or more embodiments, the microwaves may have a frequency and wavelength in a tighter range, e.g., a frequency from between about 1200 MHz to about 2700 MHz; with a wavelength from between about 110 mm to about 250 mm. The silica sand is exposed to the microwave radiation for a period of time, e.g., a preselected time, ranging from about 2 minutes to about 5 hours. In one or more other embodiments, the exposure time is between about 1 minute to about 10 minutes, from about 2 minutes to about 8 minutes, or from about 3 minutes to about 6 minutes. Beneficial results have been witnessed by Applicants with exposure times of as little as 30 to 45 seconds, however.

Figure 3:
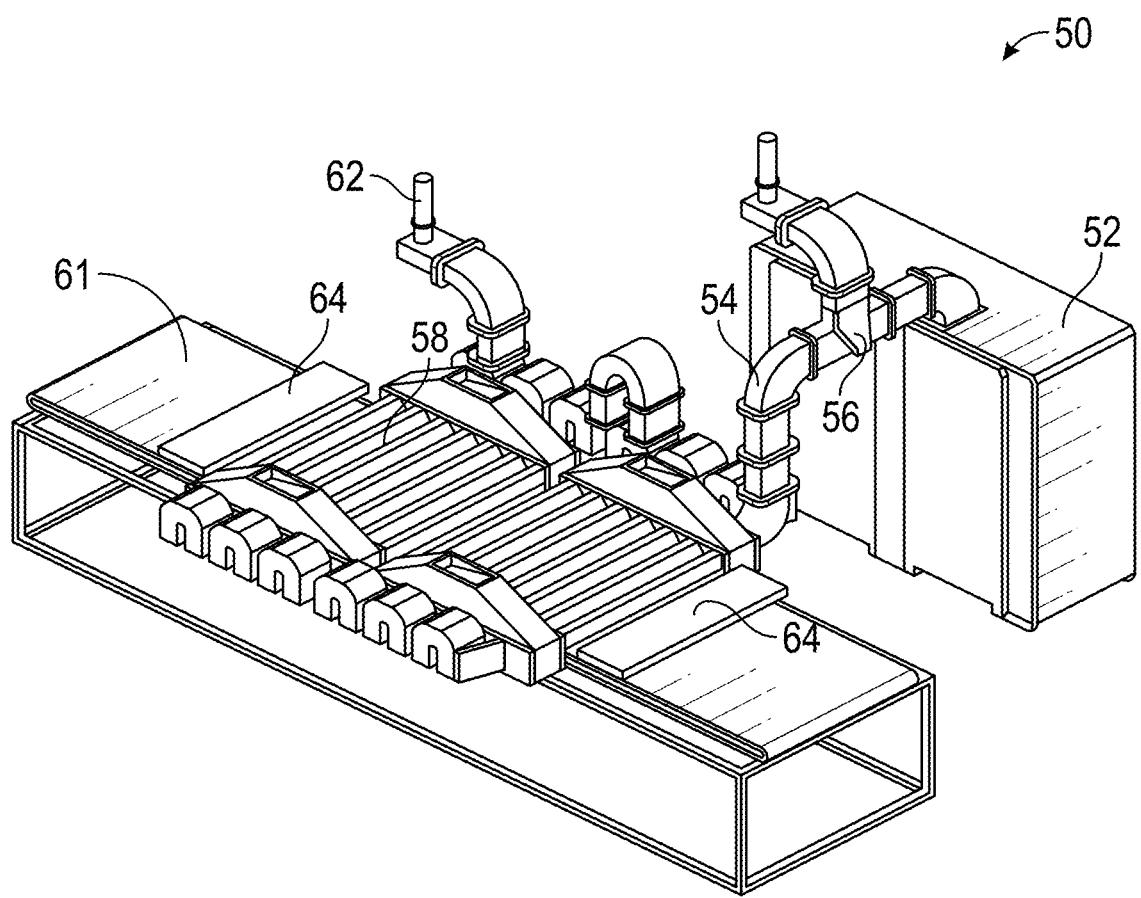
FIG. 3 is a schematic diagram of a microwaving system that permits washed silica sand to be exposed to microwave electromagnetic radiation on a continuous or semi-batch basis according to an embodiment of the disclosure.

FIG. 3 illustrates one embodiment of a microwave device 50 that may be used to expose sand to microwave electromagnetic radiation. Sand is placed onto a conveyor 61 that is arranged to move into and out of an interior heating chamber or applicator 58 defined by an outer housing. The conveyor 61 is designed to move internally within the heating chamber 58 past a magnetron (not shown), a waveguide 54 of a microwave generator 52, or other local source of microwave electromagnetic radiation (not shown). The heating chamber or applicator 58 is arranged to contain and distribute the microwave electromagnetic radiation around the sand positioned on the conveyor 61. Thus, sand placed on the conveyor 61 should be spread out such that the thickness of the sand thereon is only a few grains thick, and in at least some embodiments, only one to two grains thick. A sand placement that is too thick may obscure microwave electromagnetic radiation from penetrating and/or exposing grains of sand closer to the conveyor 61. In one or more embodiments, the conveyor 61 is moved at a slow rate so that each sand grain remains within the heating chamber 58 and is exposed to the microwave electromagnetic radiation emitted from the waveguide 54 or other microwave energy source for a microwave exposure time of between about 3 and about 5 minutes. The microwaving device 50 of FIG. 3 permits sand to be exposed to microwave electromagnetic radiation on a continuous or semi-batch basis. The frequency and wavelength of the microwave electromagnetic radiation may be selected to be within any of the respective ranges disclosed herein. As will be recognized by those skilled in the art, FIG. 3 also illustrates two chokes 64, which are microwave suppression tunnels to reduce microwave leakage from the heating chamber 58 via the conveyer 61. A circulator or isolator 56 is shown disposed in the wave guide 54 proximate the microwave generator 52 to protect the magnetron (not shown) in the microwave generator 52 from excessive levels of reflected microwave electromagnetic radiation. A waterload 62 is also positioned within device 50 to absorb microwave electromagnetic radiation into a high loss medium, e.g., water.

FIG. 4 illustrates another embodiment of a microwave device 70 that may be used to expose sand to microwave electromagnetic radiation. The microwaving device includes a housing 76 having an access door 78 in a side wall thereof that permits access to a chamber (not shown) defined by the housing 76. Sand is placed directly into the chamber via the access door 78 and spread out on an inner horizontal surface thereof such that the sand layer thickness is only a few sand grains thick, e.g., 1 to 2 sand grains thick. Alternatively, the sand may be placed on a carrier device (not shown) that permits easy insertion of the carrier device into the chamber via the access door 78 and removal of the carrier device after the microwave process has been completed. A microwave generator 72, magnetron (not shown), or other local device capable of emitting microwave electromagnetic radiation is positioned in the housing 76 (embodiment not shown), or via a waveguide 74, to expose the sand inside the chamber to emitted microwave electromagnetic radiation. The microwaving device 70 of FIG. 4 permits sand to be exposed to microwave electromagnetic radiation on a batch basis. Like the embodiment disclosed with respect to FIG. 3, the frequency and wavelength of the microwave electromagnetic radiation may be selected to be within any of the respective ranges disclosed herein.

Through the microwaving process, a transformation in the sand particles' quartz crystallography occurs that strengthens the sand particles and may also smooth the surface of the particles. The microwave radiation imparts energy to the sand particles that may reduce bonding between the silicon dioxide molecules and any impurities such that a more homogenous silicon dioxide structure may result upon cooling. Having adequate oxygen in the air surrounding the sand during the microwaving process may facilitate the improved bonding of the silicon dioxide molecules.

Often, silica sands that are used in hydraulic fracturing have a specific gravity that ranges from about 2.45 to about 2.54. Poorer quality sands have specific gravities below about 2.50. The specific gravity of silica sand treated via the attrition and microwaving processes disclosed herein have been shown to increase as a result of such treatments. TABLE 3 provides the initial specific gravity (prior to undergoing the microwaving process) and the final specific gravity (after undergoing the microwaving process) for each of Sands 1 through 5 and the Control sand.

TABLE 3

| Sample Type | Initial specific gravity | Final specific gravity |
|---|---|---|
| Sand 1 | 2.48 | 2.54 |
| Sand 2 | 2.45 | 2.50 |
| Sand 3 | 2.46 | 2.51 |
| Sand 4 | 2.48 | 2.53 |
| Sand 5 | 2.53 | 2.61 |
| Control | 2.54 | 2.54 |

Analyzing the data in TABLE 3, each of the Sands 1 through 5 had its specific gravity increased by undergoing the microwaving process disclosed herein. In fact, the specific gravity of each of Sands 1 through 5 increased to be at or above about 2.50, with the range being from about 2.50 to about 2.61. For Sand 5, its specific gravity increased to slightly above 2.60. A specific gravity of 2.60 corresponds to a nearly 100% alpha quartz crystallography. Thus, for each of the Sands 1 through 5, the microwaving process increased the specific gravity by over about 2% and toward that indicative of a true alpha quartz crystallography. As would be expected, however, the initial and final specific gravities of the Control sand remained the same, because the Control sand was not exposed to microwave electromagnetic radiation.

The depth of the transformation from the surface of the quartz sand particles exposed to the microwave radiation appears to correlate with the length of exposure. Thus, for a given frequency, longer microwave exposure times may cause a deeper transformation of the quartz sand particles than do shorter microwave exposure times. Therefore, an optimum exposure time may be sought which balances the economics of exposure time and the benefits imparted to the quartz sand. Another consideration is selection of an embodiment of a microwave device or system arranged and designed to uniformly expose the sand grain particles to the microwave electromagnetic radiation, thereby permitting uniform heating.

In some arrangements, the exposure time can be reduced significantly, while maintaining the same or greater strengthening of the quartz sand particles, if the frequency and wavelength ranges are targeted between 8 GHz to 75 GHz and 4.0 mm to 37.5 mm, respectively. However, microwave generators, e.g., magnetrons, capable of emitting microwaves within these frequency and wavelength ranges tend to be very expensive, and thus may not be commercially viable sources for the microwaving process.

Example 2

The crush resistance of the five different sands described above was determined prior to subjecting each type of sand to the microwaving process. Accordingly, samples of the five different sands, each having undergone the attrition process disclosed above, and the Control sand were first tested for crush resistance on a dry basis following the procedures generally set out in API RP 56, which prescribe standard, recommended practices for testing sand used in gravel packing operations. For each of the Sands 1 through 5 and the Control sand, 40 grams of the particular sand was placed into a cylindrically-shaped crush cell. A piston, arranged to fit within the cylindrically-shaped crush cell without significant gap therebetween, was lowered into the crush cell above the sand sample. The piston was moved downwardly to apply pressure on the sand sample disposed at the bottom of the crush cell. In conducting this dry crush test, one minute was permitted for the piston to attain the desired pressure against the sand sample. After the initial minute, the desired pressure was maintained for an additional two minutes.

In a first set of tests, each of the sand samples was subjected to 6,000 psi pressure by the piston. Each sample was then placed on a 40 mesh screen to determine how many fines had been created by the piston-applied 6,000 psi. The percentage of the total sand falling through the 40 mesh screen and onto the pan beneath, i.e., fines less than 40 mesh, represents the crush percentage for each sand sample. The above procedures were repeated for a second set of samples of Sands 1 through 5 for a piston-applied pressure of 8,000 psi.

TABLE 4 provides the pre-microwave process crush data for each of the sand samples, Sand 1 through Sand 5, and the Control sand, from these two separate crush tests: one conducted at 6,000 psi and the other conducted at 8,000 psi. The 6,000 psi crush test data is provided on the second column of Table 4, and the 8,000 psi crush test is provided on the third column thereof.

TABLE 4

| Sample # | % crush at 6,000 psi | % crush at 8,000 psi |
|---|---|---|
| Sand 1 | 7.84 | 13.95 |
| Sand 2 | 8.68 | 15.46 |
| Sand 3 | 8.56 | 14.74 |
| Sand 4 | 11.62 | 27.19 |
| Sand 5 | 5.69 | 10.08 |
| Control | 5.69 | 10.08 |

Samples of the five sands, Sands 1 through 5, (but not the Control sand) were then separately exposed to microwave radiation in a lab scale microwave device. The lab scale microwave device that was used has a microwave/heating chamber with a Plexiglas side or front. The microwave chamber is similar to that shown with respect to FIGS. 3 and 10 and has a length of about three feet. A 14-inch wide conveyor belt runs through the microwave chamber and is operated by a variable speed drive. Sand particles were spread upon the top conveyor belt proximate the entrance to the microwave chamber. The variable speed drive controlled the speed of the conveyor belt such that the individual sand particles were exposed to approximately 120 seconds of microwave electromagnetic radiation in the microwave chamber. The microwave electromagnetic radiation had a frequency of about 1665 MHz and a wavelength of about 180 mm. As the microwave treated sand particles exited the microwave chamber, they fell off of the end portion of the conveyor and into a treated sand collection container.

After exposing each of the Sands 1 through 5 to the microwave radiation as specified above in this Example 2, the crush resistance of these five different sands and the Control sand (which was not exposed to microwave radiation) was determined using the same procedure described above.

TABLE 5 provides the post-microwave process crush data for each of the sand samples, Sand 1 through Sand 5, and the Control sand, from the two separate crush tests: one conducted at 6,000 psi (second column) and the other conducted at 8,000 psi (third column).

TABLE 5

| Sample # | % crush at 6,000 psi | % crush at 8,000 psi |
|---|---|---|
| Sand 1 | 6.52 | 11.85 |
| Sand 2 | 7.46 | 13.48 |
| Sand 3 | 7.25 | 12.62 |
| Sand 4 | 10.82 | 25.29 |
| Sand 5 | 3.88 | 7.88 |
| Control | 5.69 | 10.08 |

Comparing the crush data of TABLE 4 and TABLE 5, each of the microwave-treated Sands 1 through 5 saw a decrease in the percentage of crush, or fines less than mesh size 40, resulting from the pressure tests performed. This result was realized for both of the pressure tests at 6,000 psi and at 8,000 psi. Looking at the Control sand between TABLE 4 and TABLE 5, no difference in the percentage of crush resulted. This was to be expected since neither Control sand sample was exposed to microwave electromagnetic radiation.

Example 3

In another test designed to account for the heat and moisture that may be experienced by sand in a downhole well, the crush resistance of samples of each of the five different sands, Sands 1 through Sand 5, and the Control sand was tested in hot and wet conditions both prior to microwave electromagnetic radiation treatment and afterward. Each of sand samples, Sand 1 through Sand 5, first underwent the attrition process disclosed above. Although there may be no standard test procedure for hot-wet crush, the procedures for carrying out this crush test of Example 3 were the same as those described for Example 2. The crush cell was modified, however, to permit fluid to be present during the crush test. This modification included making entry and exit openings in the crush cell to allow a 2 wt % KCl solution at about 210° F. to flow through the sand sample in the crush cell throughout the approximate three minute duration of the hot-wet crush test. Additionally, the crush cell was pre-heated to approximately 250° C. prior to adding the sand sample and the KCl solution water. In this hot-wet crush test, each 40 gram sample of the Sands 1 through 5 and the Control sand was added to the modified crush cell. The procedures according Example 2 then were followed to test each sand sample and the 2 wt % KCl solution at about 210° F. was pump through the modified crush cell during the approximate 3 minute test. Fines were collected after each test and dried in a pan prior to measuring the percentage of fines generated as a result of each test.

TABLE 6 provides the pre-microwave process hot-wet crush data for each of the dried sand samples, Sand 1 through Sand 5 and the Control sand, from these two separate hot-wet crush tests: one conducted at 6,000 psi and the other conducted at 8,000 psi. The 6,000 psi crush hot-wet test data is provided on the second column of Table 6, and the 8,000 psi hot-wet crush test is provided on the third column of Table 6. For each of the Sands 1 through 5 and the Control sand, three samples were tested through the same procedure and the results averaged to arrive at the data presented in Table 6.

TABLE 6

| Sample # | % crush at 6,000 psi | % crush at 8,000 psi |
|---|---|---|
| Sand 1 | 10.06 | 16.97 |
| Sand 2 | 12.95 | 20.05 |
| Sand 3 | 11.42 | 18.52 |
| Sand 4 | 15.94 | 32.86 |
| Sand 5 | 8.69 | 14.43 |
| Control | 8.69 | 14.43 |

Samples of the five sands, Sands 1 through 5, (but not the Control sand) were then separately exposed to microwave electromagnetic radiation. The same procedures and devices used with respect to the samples of Example 2 were also used to expose the sand samples to magnetic electromagnetic radiation in this Example 3.

After exposing each of the Sands 1 through 5 to the microwave radiation as specified, the hot-wet crush resistance of these five different sands and the Control sand was determined using the same procedure described above.

TABLE 7 provides the post-microwave process hot-wet crush data for each of the dried sand samples, Sand 1 through Sand 5, and the Control sand, from the two separate hot-wet crush tests: one conducted at 6,000 psi (second column) and the other conducted at 8,000 psi (third column). For each of the Sands 1 through 5 and the Control sand, three samples were tested through the same procedure and the results averaged to arrive at the data presented in Table 7.

TABLE 7

| Sample # | % crush at 6,000 psi | % crush at 8,000 psi |
|---|---|---|
| Sand 1 | 8.06 | 12.16 |
| Sand 2 | 9.31 | 15.05 |
| Sand 3 | 8.82 | 15.66 |
| Sand 4 | 13.68 | 29.96 |
| Sand 5 | 6.52 | 11.35 |
| Control | 8.69 | 14.43 |

Comparing the crush data of TABLE 6 and TABLE 7, each of the microwave-treated Sands 1 through 5 saw a decrease in the percentage of crush, or fines less than mesh size 40, resulting from the pressure tests performed. This result was realized both for the pressure tests at 6,000 psi and at 8,000 psi. Looking at the Control sand between TABLE 6 and TABLE 7, no difference in the percentage of crush resulted. This was to be expected since neither Control sand sample was exposed to microwave electromagnetic radiation.

Example 4

A more comprehensive sieve distribution analysis was conducted of the each of the sand samples, Sands 1 through 5, and the Control sand, undergoing the hot-wet crush test according to Example 3. The sieve distribution was conducted according to ISO 13503-2 and API RP 19C, as will be understood by those skilled in the art. TABLE 8 provides the percentage by sieve number of the total composition of each of the sand samples, Sands 1 through 5, and the Control sand, after undergoing the hot-wet crush test according to the procedures of Example 3. The data in TABLE 8 was measured from sand samples that were not exposed to microwave electromagnetic radiation in the microwaving process disclosed herein.

TABLE 8

| Sieve | Sand 1 | Sand 2 | Sand 3 | Sand 4 | Sand 5 | Control |
|---|---|---|---|---|---|---|
| 30 | 0.00 | 0.00 | 0.00 | 0.00 | 1.03 | 1.07 |
| 40 | 0.00 | 0.00 | 0.00 | 0.00 | 1.31 | 1.69 |
| 50 | 2.62 | 2.07 | 2.92 | 1.62 | 4.19 | 3.62 |
| 60 | 5.81 | 4.42 | 3.59 | 4.16 | 8.26 | 8.18 |
| 70 | 15.27 | 5.24 | 6.22 | 7.52 | 20.06 | 19.28 |
| 100 | 28.30 | 31.72 | 25.41 | 9.88 | 23.94 | 25.72 |
| 140 | 3.19 | 5.82 | 13.31 | 7.80 | 4.30 | 4.16 |
| Pan | 44.81 | 50.73 | 48.55 | 69.02 | 36.91 | 36.28 |

TABLE 9 provides the percentage by sieve number of the total composition of each of the sand samples, Sands 1 through 5, and the Control sand, after undergoing the hot-wet crush test according to the procedures of Example 3. The data in TABLE 9 were measured from sand samples that were exposed to microwave electromagnetic radiation in the microwaving process as disclosed with respect to Example 2.

TABLE 9

| Sieve | Sand 1 | Sand 2 | Sand 3 | Sand 4 | Sand 5 | Control |
|---|---|---|---|---|---|---|
| 30 | 0.00 | 0.00 | 0.00 | 0.00 | 1.87 | 1.11 |
| 40 | 0.55 | 0.00 | 0.00 | 0.00 | 2.26 | 1.82 |
| 50 | 3.13 | 2.12 | 3.13 | 0.00 | 5.16 | 3.57 |
| 60 | 6.35 | 4.65 | 4.06 | 6.03 | 10.05 | 8.35 |
| 70 | 17.38 | 8.67 | 7.95 | 7.78 | 23.64 | 20.52 |
| 100 | 32.49 | 35.44 | 29.17 | 13.19 | 27.66 | 26.19 |

TABLE 9-continued

| Sieve | Sand 1 | Sand 2 | Sand 3 | Sand 4 | Sand 5 | Control |
|---|---|---|---|---|---|---|
| 140 | 20.95 | 20.66 | 26.11 | 28.15 | 18.34 | 3.03 |
| Pan | 19.15 | 28.46 | 29.58 | 44.85 | 11.02 | 36.52 |

Comparing the results between TABLE 8 and TABLE 9, the sand samples, Sands 1 through 5, that were exposed to microwave electromagnetic radiation, as represented by the data of TABLE 9, generally show a much greater overall percentage of sand grain particles that fall within measureable sieve sizes, e.g., 50, 60, 70, 100, and 140, than the analogous sand samples that did not undergo the microwaving process. Conversely, the sand samples, Sands 1 through 5, that were not exposed to microwave electromagnetic radiation, as represented by the data of TABLE 8, generally show a much greater overall percentage of unmeasured sieve size fines, identified as "pan" (as understood by those skilled in the art), than the analogous sand samples that underwent the microwaving process.

Fracture conductivity testing may be used to assess the effectiveness of the microwaving process at increasing the strength, quality and durability of sand proppant. Fracture conductivity testing assesses how a proppant will perform in the wellbore once injected into hydraulic fractures within the formation. Fracture conductivity is thus a measurement of how easily a fluid flows through a fracture and is calculated as the permeability multiplied by the thickness of the proppant pack according to the following equation:

$$kW_f = \mu Q L / w \Delta P$$

where k is the proppant pack permeability in darcy, $W_f$ is the pack thickness in cm, $\mu$ is the viscosity of the test liquid at room temperature in cp, Q is the flow rate in $cm^3/s$, L is the length between pressure ports in cm, w is the width of the cell in cm, and $\Delta P$ is the pressure drop ($P_{upstream} - P_{downstream}$) in kPa.

Silica sand proppants having a greater crush resistance tend to effectuate greater fracture conductivities as compared to silica sand proppants having lower crush resistance. Sands of lower crush resistance, once subjected to high pressure in the hydraulic fractures, may create greater amounts of fines that interfere with and hinder the conductivity of fluid passing through the fractures, thereby decreasing the conductivity.

Example 5

To understand the expected differences in the fracture conductivities of the silica sand samples, Sands 1 through 5, with and without microwave electromagnetic radiation treatment, the following standard conductivity procedures were employed: API RP 19D (Recommended Practice for Measuring the Long-term Conductivity of Proppants, 2008) and ISO13503-5:2006 (standard testing procedures for evaluation proppants used in hydraulic fracturing and gravel packing operations), as will be understood by those skilled in the art.

It should be noted that Sands 1 through 5 and the Control sand were each tested in separate tests. Under the API RP 19D Standard testing, a Cooke cell or testing cell, having pressure ports spaced along its length, was set up according to the Standard's procedures. The Cooke cell has a top and bottom piston that applies pressure stresses to simulate formation pressures that may be encountered by the proppant in the wellbore.

For each test, the sand sample was loaded into the core of the Cooke cell between sandstone platens and at an equivalent of about two pounds of sand per square foot. The top and bottom pistons apply pressure at a rate of 100 psi/min+/−5 psi/min until the cell has reached a 2,000 psi increment, at which point the 2,000 psi pressure is maintained for approximately 50 hours. Because each pressure interval requires 50 hours of time to reach a steady state prior to any measurement, the conductivity test may take two to three weeks to complete. A 2 wt % potassium chloride (KCl) solution was then pumped into the Cooke cell through an end thereof at a rate between 2 ml/min and 8 ml/min to reduce any clay swelling and thereby mitigate variability between the tests of the several samples. The KCl solution and Cooke cell were maintained at 150° F. throughout the testing. Data were measured a minimum of five times at each pressure increment and averaged to yield a permeability for each pressure. According to the API RP 19D Standard, each sample of sand is tested at pressure increments of 2,000 psi, 4,000 psi and 6,000 psi. In this Example 5, a pressure interval of 8,000 psi also was tested.

TABLE 10 shows the pre-microwave process proppant conductivity data for each of the sand samples, Sand 1 through Sand 5, and the Control sand, using the fracture conductivity tests described above. The conductivity at 6,000 psi is given in the second column for each sample and the conductivity at 8,000 psi is given in the third column for each sample.

TABLE 10

| Sample # | Conductivity (md-ft) at 6,000 psi | Conductivity (md-ft) at 8,000 psi |
| --- | --- | --- |
| Sand 1 | 1110 | 557 |
| Sand 2 | 820 | 480 |
| Sand 3 | 981 | 447 |
| Sand 4 | 628 | 125 |
| Sand 5 | 1396 | 595 |
| Control | 1428 | 613 |

TABLE 11 provides the proppant conductivity data, using the fracture conductivity tests described above, for each of the sand samples, Sand 1 through Sand 5 and the Control sand, after each of the sand samples (except the Control sand sample) was exposed to microwave electromagnetic radiation during the microwaving process disclosed above in Example 2. The conductivity at 6,000 psi is given in the second column for each sample and the conductivity at 8,000 psi is given in the third column for each sample.

TABLE 11

Proppant Conductivity after treatment

| Sample # | Conductivity (md-ft) at 6,000 psi | Conductivity (md-ft) at 8,000 psi |
| --- | --- | --- |
| Sand 1 | 1465 | 700 |
| Sand 2 | 1010 | 601 |
| Sand 3 | 1240 | 587 |
| Sand 4 | 775 | 188 |
| Sand 5 | 1654 | 779 |
| Control | 1391 | 607 |

When comparing the proppant conductivity data of TABLE 10 and TABLE 11, each of the microwave-treated Sands 1 through 5 shows a marked increase in the conductivity (TABLE 11) based on the pressure tests performed as compared to its analogous sand sample that was not treated with microwave electromagnetic radiation (TABLE 10). This result was realized both for the pressure tests at 6,000 psi and at 8,000 psi. Looking at the Control sand between TABLE 10 and TABLE 11, the conductivities at the 6,000 psi pressure interval and the 8,000 psi pressure intervals remained about the same. This was to be expected since neither Control sand sample was exposed to microwave electromagnetic radiation.

Figure 5A:
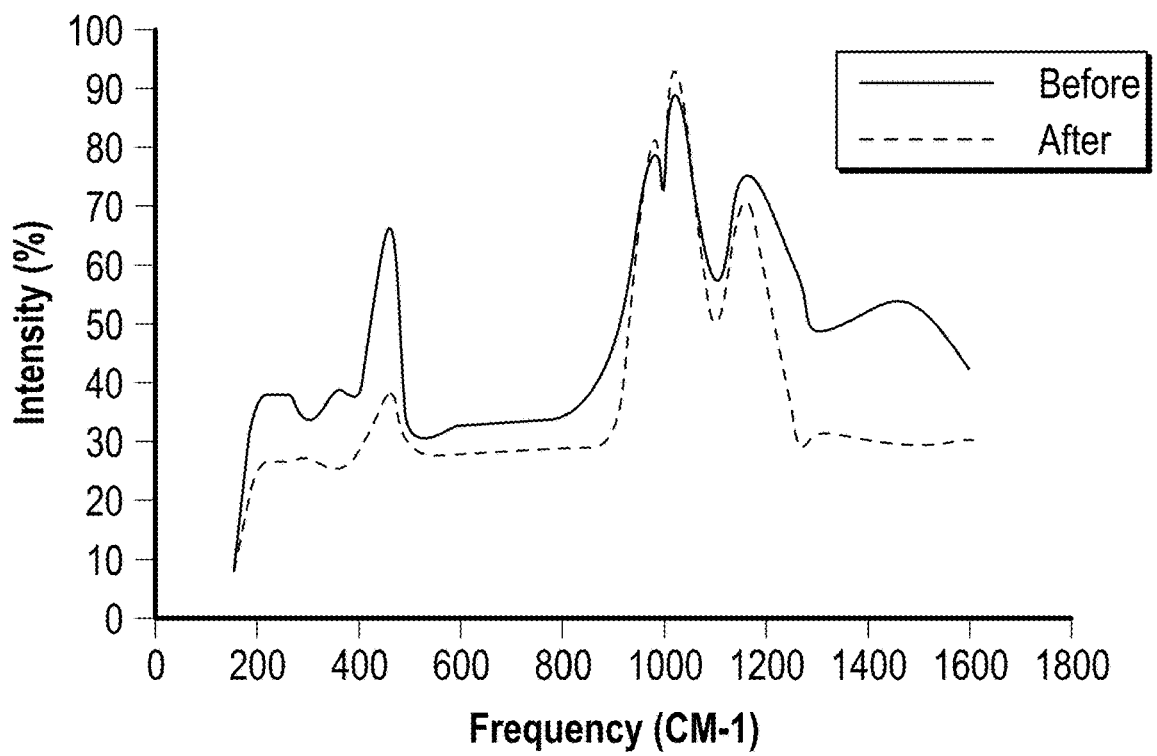
FIGS. 5A to 5E are graphs of Raman spectroscopy responses for each of a plurality of sand samples, Sands 1 through 5, before and after exposure to microwave electromagnetic radiation, according to an embodiment of the disclosure, and in particular.
Figure 5B:
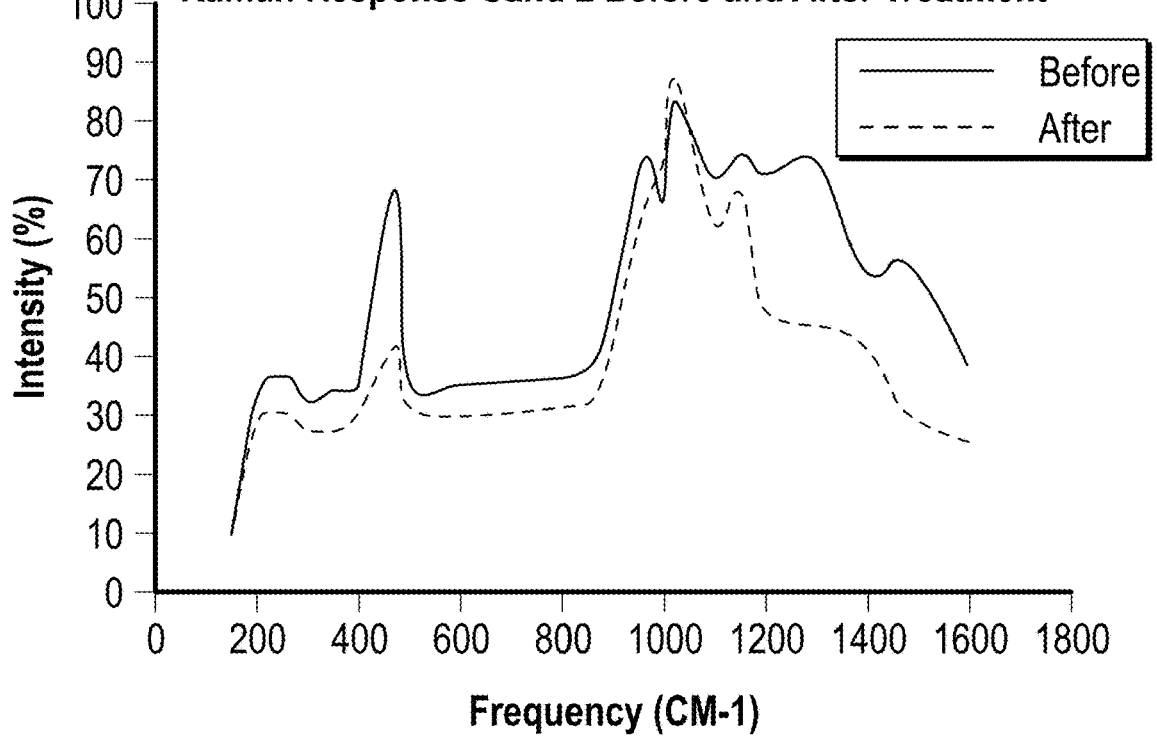
Figure 5C:
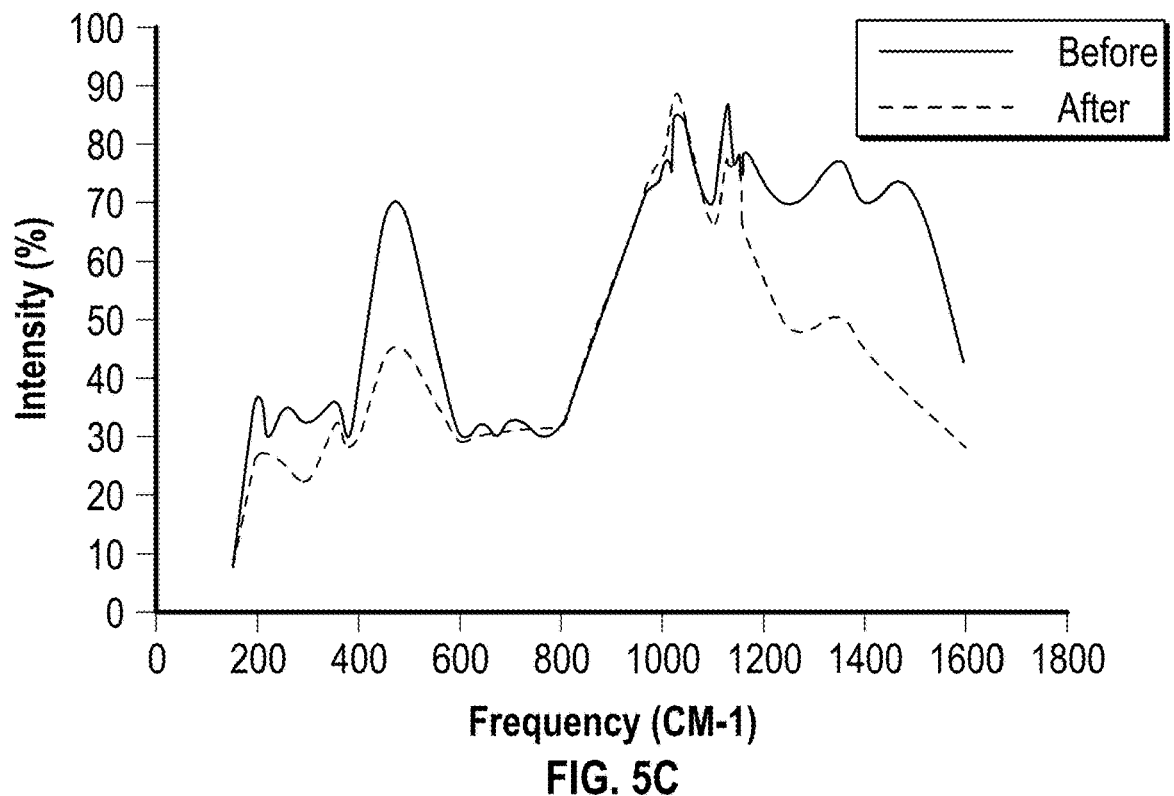
Figure 5D:
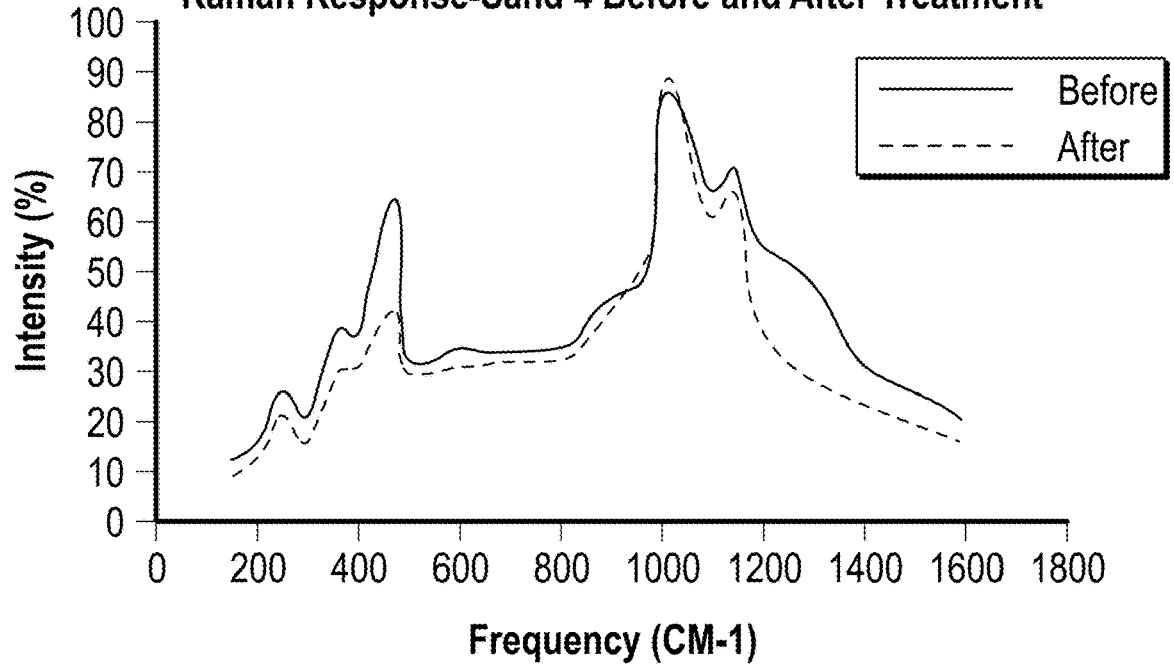
Figure 5E:
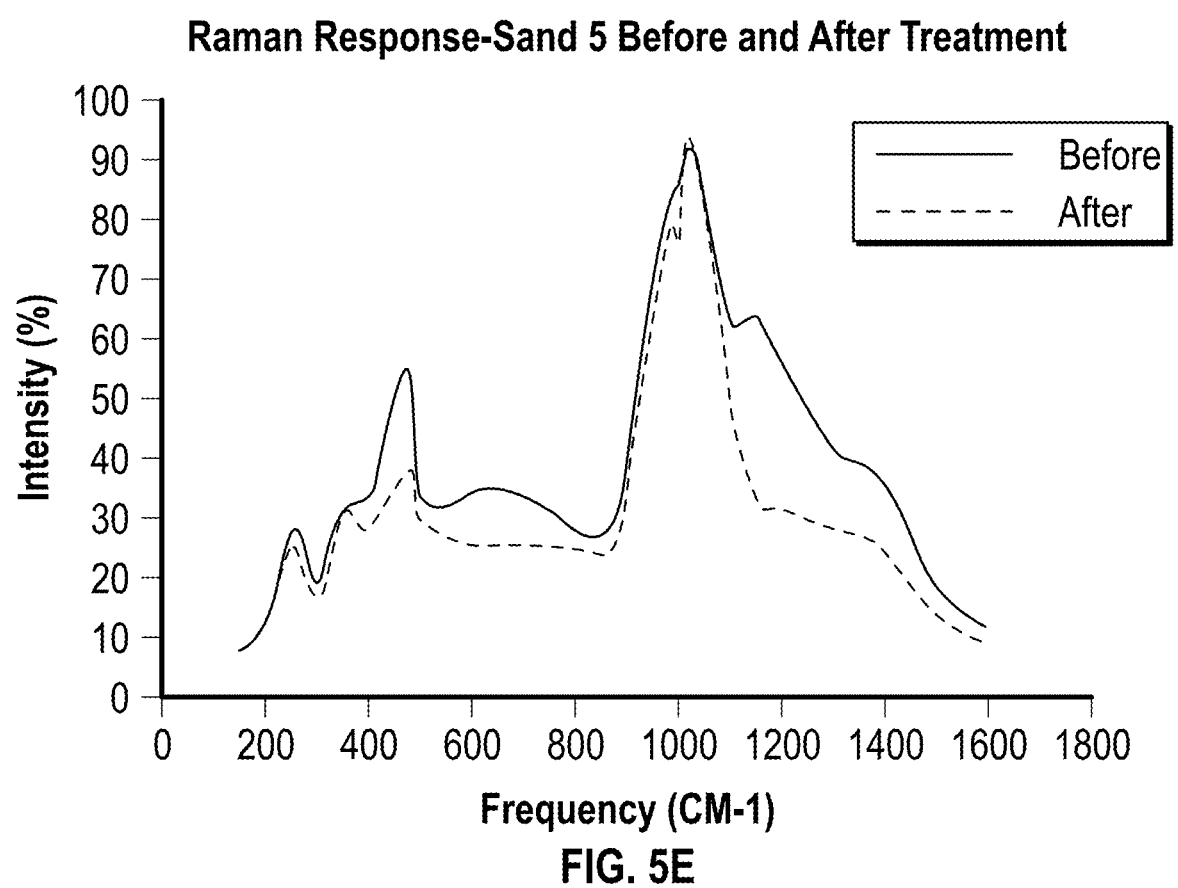

FIGS. 5A through 5E are graphical representations of Raman spectroscopy responses, one graph for each of the sand samples, with responses before and after exposure to microwave electromagnetic radiation plotted. FIG. 5A is the Raman spectroscopy response of Sand 1, FIG. 5B is the Raman spectroscopy response of Sand 2, FIG. 5C is the Raman spectroscopy response of Sand 3, FIG. 5D is the Raman spectroscopy response of Sand 4, and FIG. 5E is the Raman spectroscopy response of Sand 5. The x-axis on each of FIGS. 5A to 5E shows the frequency range used for the test. Separate tests were run under low frequency range (from about 200 $cm^{-1}$ to about 800 $cm^{-1}$) and high frequency range (from about 800 $cm^{-1}$ to about 1600 $cm^{-1}$). Looking at the red plot showing the Raman spectroscopy response of the microwave-treated silica sand in FIGS. 5A through 5E, generally, there is a significant depression in intensity peaks around 450 $cm^{-1}$, followed by an increase in intensity between about 950 to 1050 $cm^{-1}$, followed by the disappearance or significant decrease in intensity peaks after 1050 $cm^{-1}$, as compared to the blue plot showing the Raman spectroscopy response of the untreated silica sand. These changes are indicative of structural changes in the quartz particles of the silica sand. The low frequency region of the Raman spectroscopy response plots is less than about 800 $cm^{-1}$. The frequency near about 450 $cm^{-1}$ of this low frequency region is associated with responses to mono- and di-valent ions bonded to the silica structure, and is thus indicative of weakness in the silica structure by invasion of impurities into the Si—O—Si lattice. Close to perfect alpha quartz structure and bonding resonates at a maximum intensity of around 1025 $cm^{-1}$, while responses in the region between 950 to 1050 $cm^{-1}$ is still considered to be indicative of the presence of a strong, silica lattice with possibly some impurities. The distortion or shift from about 1025 $cm^{-1}$ indicates the presence of an impurity which is sufficiently insignificant, for purpose of the Raman spectroscopy response, to place the resonance out of the "silica" region, i.e., region indicative of close to perfect alpha quartz structure. The impurity, however, is still powerful enough to shift the response away at about 1025 $cm^{-1}$.

Tumbling Process

In one or more embodiments, a tumbling process is used to physically alter the shape of the individual sand grains. Thus, the tumbling process aims to eliminate or at least lessen the angularity of the individual sand grains to thereby increase the roundness and/or sphericity of the sand grains. Most all sand, including even high-quality white sand, can have outer surfaces with physical characteristics of platy, layery, and scaly nature, along with many ridges and valleys present, that can be made more round and/or spherical through a physical tumbling process.

Figure 6:
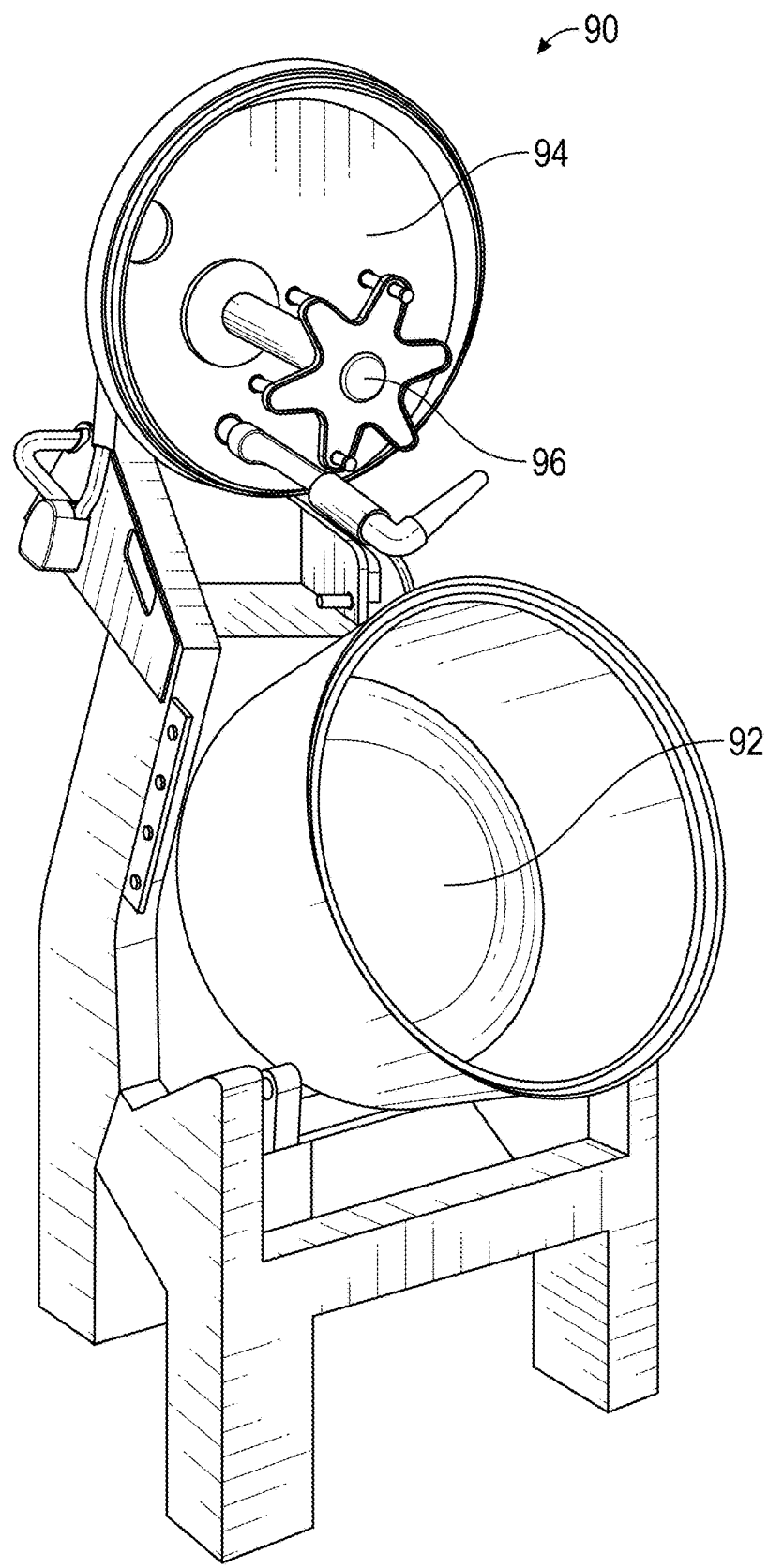
FIG. 6 is a tumbling apparatus that may be used to tumble washed silica sand after exposure to microwave electromagnetic radiation according to an embodiment of the disclosure.

In one or more embodiments, the tumbling process occurs almost immediately, or without any significant delay, after the microwaving process. Referring to FIG. 6, the treated silica sand is placed in the barrel 92 of a mixer or tumbler 90 that is capable of being rotated upon an axis thereof at least at about five rotations per minute and up to about twenty rotations per minute. The barrel 92 has a lid or top 94 that covers the barrel 92 during operation. An agitator or stirrer 96 is shown coupled to the inner lid or top 94 and may be arranged to agitate or stir the sand within the barrel 92 during operation. The tumbler or mixer 90 of one or more embodiments may be similar to that of FIG. 6, which is an Eirich mixer manufactured by Eirich Machines Inc. of Gurnee, Ill., as will be understood by those skilled in the art. Tumbling the microwave-treated sand particles together in a tumbler for about 30 minutes to about one hour increases the roundness of the sand particles. In one or more embodiments, the tumbling time may be preselected and may be as little as about 5 minutes, about 10 minutes, about 15 minutes, about 20 minutes or about 25 minutes or as much as about 75 minutes, about 90 minutes, about 105 minutes or about 120 minutes. Although the tumbling process can be performed at any time, better results may be achieved if the tumbling process of the microwave-treated silica sand is started almost immediately following the microwaving process, e.g., while the individual sand grains have a temperature above ambient temperature. In one or more embodiments, the tumbling process is started on the microwave-treated silica sand within about 30 seconds to about 1 minute following the microwaving process. In one or more other embodiments, the tumbling process is started on the microwave-treated silica sand within about 1 to about 2 minutes following the microwaving process. Yet still, in one or more other embodiments, the microwave-treated sand is moved from the microwaving process to the tumbling process within about 5 minutes and the tumbling process begun. The microwaving process imparts heat energy to the individual silica sand grains; therefore, the sand grains are more malleable and more easily rounded soon after the microwaving process, e.g., within minutes thereof.

Additionally, the mixer or tumbler 90 shown in FIG. 6 can be modified with heat bands (not shown) to raise the temperature of the sand and/or maintain the sand temperature during the tumbling process. A temperature range of between about 125° F. to about 180° F., for example, may be used to facilitate altering the silica sand grains to be more round and/or spherical in a shorter period of time. Insulation material (not shown) also may be added to the outer surface of the mixer to minimize loss of heat. Although an Eirich mixer is shown in FIG. 6 as an embodiment of a mixer or tumbler, those skilled in the art will recognize that a different type of mixer or tumbler may be employed so long as the sand grains are sufficiently agitated as to cause them to become more round and/or spherical.

Figure 7A:
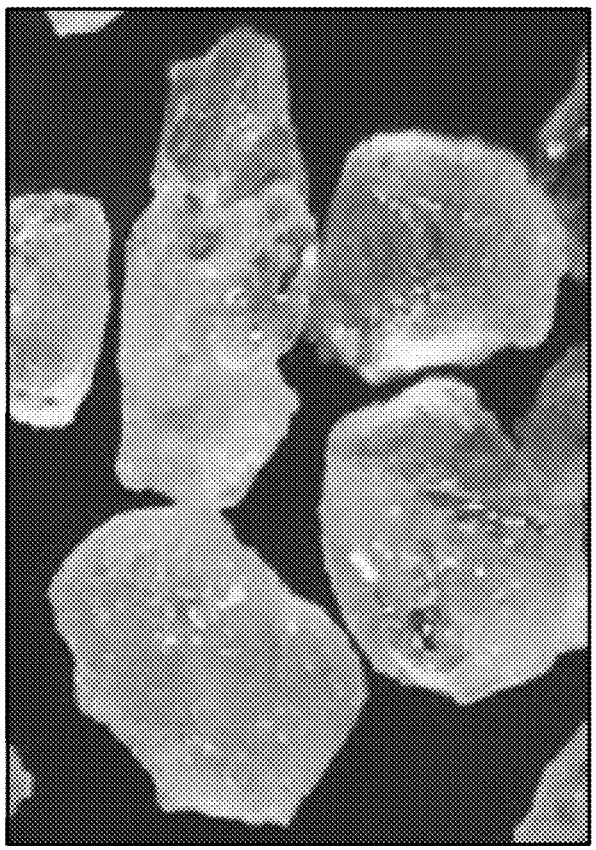
FIG. 7A is a scanning-electron-microscope enlarged image of angular sand before undergoing a tumbling process according to an embodiment of the disclosure.
Figure 7B:
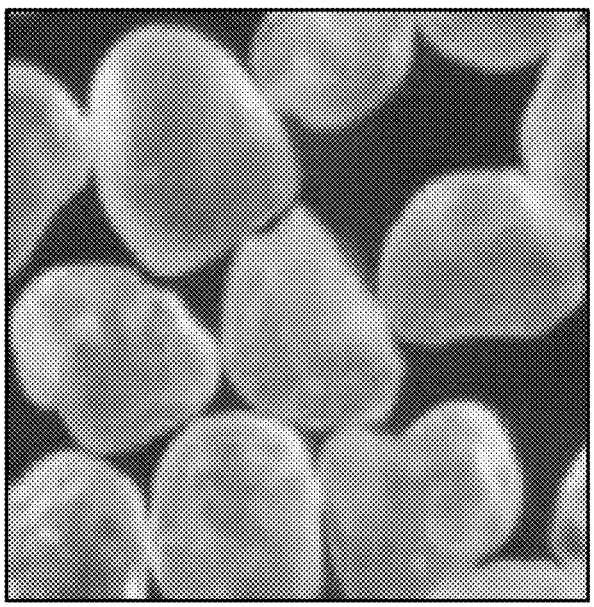
FIG. 7B is a scanning-electron-microscope enlarged image of the angular sand after undergoing a tumbling process according to an embodiment of the disclosure.

FIG. 7A shows an enlarged image from a scanning electron microscope (as will be understood by those skilled in the art) and illustrates the angularity of individual silica sand particles prior to undergoing the tumbling process according to one or more embodiments disclosed herein. FIG. 7B shows an enlarged image from a scanning electron microscope (as will be understood by those skilled in the art) and illustrates the angularity of individual silica sand particles after the microwave treated silica sand was tumbled for 30 minutes in at Eirich mixer used for foundry sand mold making. A quick comparison of the silica sand particles between FIG. 7A and FIG. 7B clearly shows that silica sand particles shown in FIG. 7B, which underwent the tumbling process are rounder and more spherical than those of FIG. 7A. Visual imagery, such as the scanning electron microscope images of FIGS. 7A and 7B, is one of the more effective verifications of the improvements in the roundness and/or sphericity to the individual silica sand particles imparted by the tumbling process.

TABLE 12 provides the proppant conductivity data, using the fracture conductivity tests described previously, for each of the sand samples, Sand 1 through Sand 5 and the Control sand, after each of the sand samples was treated in the microwaving process but before undergoing the tumbling process. The conductivity at 1,000 psi is given in the second column for each sample, the conductivity at 2,000 psi is given in the third column for each sample, and the conductivity at 3,000 psi is given in the fourth column of each sample.

TABLE 12

| Sample # | Conductivity (md-ft) at 1000 psi | Conductivity (md-ft) at 2000 psi | Conductivity (md-ft) at 3000 psi |
|---|---|---|---|
| Sand 1 | 5505 | 4325 | 3746 |
| Sand 2 | 4333 | 3412 | 2757 |
| Sand 3 | 4512 | 3735 | 2813 |
| Sand 4 | 3916 | 3019 | 2275 |
| Sand 5 | 5539 | 4404 | 3854 |
| Control | 5491 | 4422 | 3833 |

TABLE 13 provides the proppant conductivity data, using the fracture conductivity tests described previously, for each of the sand samples, Sand 1 through Sand 5 and the Control sand, after each of the sand samples (except the Control sand) was tumbled during the tumbling process disclosed above. The conductivity at 1,000 psi is given in the second column for each sample, the conductivity at 2,000 psi is given in the third column for each sample, and the conductivity at 3,000 psi is given in the fourth column of each sample.

TABLE 13

| Sample # | Conductivity (md-ft) at 1000 psi | Conductivity (md-ft) at 2000 psi | Conductivity (md-ft) at 3000 psi |
|---|---|---|---|
| Sand 1 | 5762 | 4531 | 3881 |
| Sand 2 | 4813 | 3834 | 3054 |
| Sand 3 | 4963 | 4122 | 3116 |
| Sand 4 | 4121 | 3216 | 2475 |
| Sand 5 | 5839 | 4676 | 4018 |
| Control | 5502 | 4437 | 3798 |

When comparing the proppant conductivity data of TABLE 12 and TABLE 13, each of the tumbled Sands 1 through 5 shows a marked increase in the conductivity (TABLE 13) based on the pressure tests performed as compared to its analogous sand sample that was not tumbled (TABLE 12). This result was realized for the pressure tests at 1,000 psi, 2,000 psi and at 3,000 psi. Looking at the Control sand between TABLE 12 and TABLE 13, the conductivities at each of the pressure intervals remained about the same. This was to be expected since neither Control sand sample underwent the tumbling process.

Various embodiments of process arrangements to strengthen sand proppants will now be described with reference to FIGS. 8A through 12. FIG. 8A is a schematic flow diagram illustrating an embodiment of an arrangement to strengthen sand proppant, which includes a sand screening process, an attrition process, a drying process, a microwaving process, and a tumbling process. In the arrangement 100 of FIG. 8A, raw sand 16 is fed into the sand screening process, represented by block 110, and sorted by mesh size. The sorted sand 15, 17, 27, below the sand screening process block 110, represents the raw sand 16 that was screened out through this process. The sand sorted for further processing, e.g., by a sand screening process similar to that shown and described with respect to FIG. 1, is routed to the attrition process represented by block 130. A wash solution, e.g., a KCl solution, is added and the spent wash solution is removed via line 44. The washed sand is sent to be dried as represented by block 140. Block 140 is optional and represents either a residence time for air drying or a dryer in which the washed sand is subjected to heated air. The dried sand (or sand from block 130 if no drying process is present) is then routed to the microwaving process represented by block 150. A waveform 54 is positioned to route microwave electromagnetic radiation into the microwaving process. The microwave-treated sand is then routed to a tumbling process, which is represented by block 190. After undergoing the tumbling process, the finished sand 198 is stockpiled for subsequent use.

FIG. 8B is a schematic flow diagram illustrating another embodiment of an arrangement to strengthen sand proppant, which includes an attrition process, a drying process, a microwaving process, and a tumbling process. The arrangement 101 of FIG. 8B is similar to the arrangement of FIG. 8A, except that in the arrangement of FIG. 8A, the raw sand, represented by block 19, is pre-sorted. In one or more embodiments (not shown in FIG. 8A or 8B), the washed sand may be routed directly from the attrition process represented by block 130 to the microwaving process represented by block 150 without undergoing any drying process.

Figure 9:
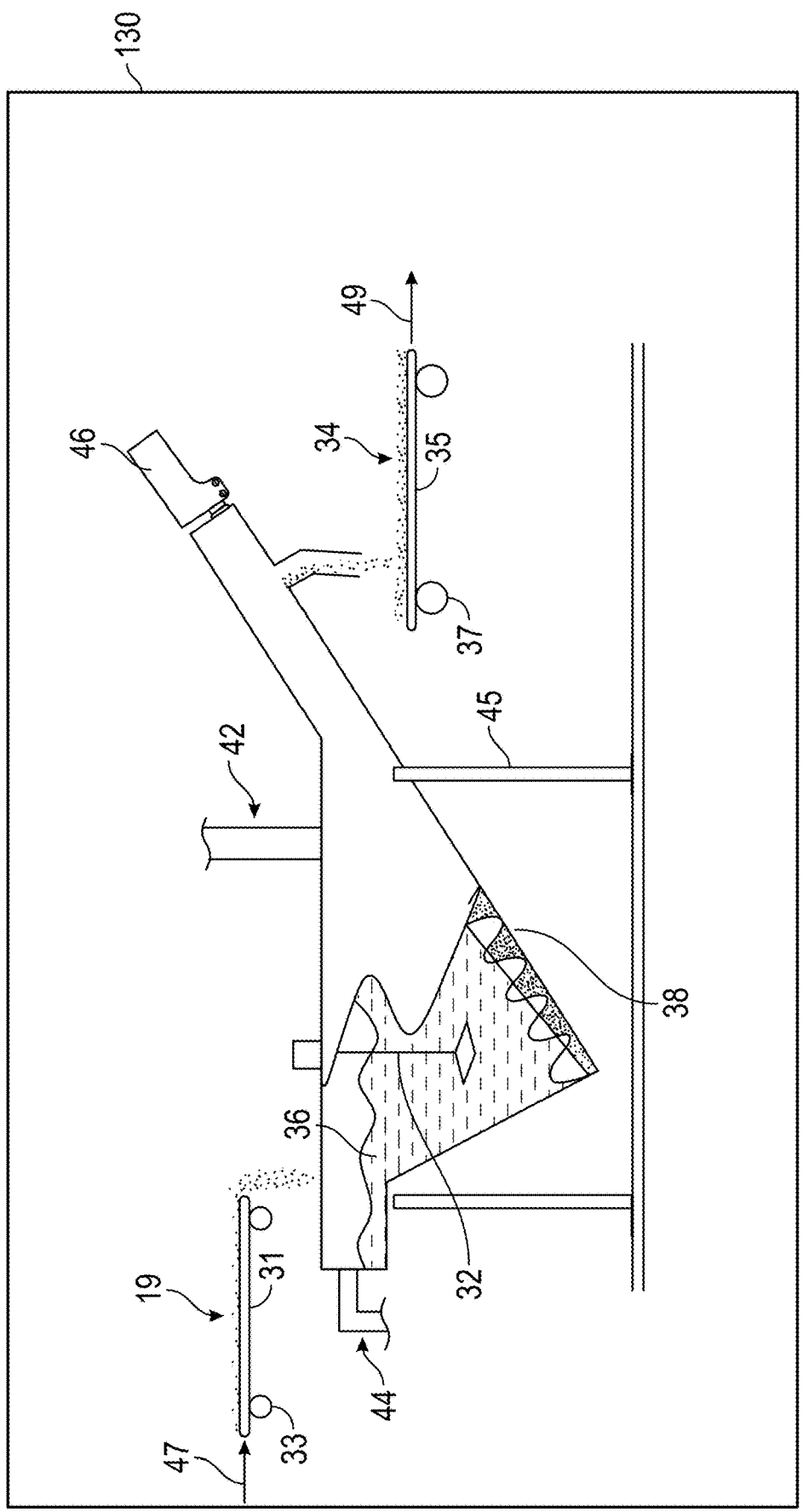
FIG. 9 is a schematic flow diagram illustrating an embodiment of the attrition process of FIGS. 8A and 8B.

FIG. 9 is a schematic flow diagram illustrating an embodiment of the attrition process that is represented by block 130 of FIGS. 8A and 8B. As illustrated, sorted sand 19 enters the process at 47 via a conveyor 31 supported by conveyor supports 33. The sand is offloaded into a washer 36 that has a wash solution therein and is suspended above floor level via supports 45. Fresh wash solution, e.g., a KCl solution, is added via piping 42. The spent wash solution is decanted from the sand in the washer 36 via piping 44. The sand in the wash solution is stirred in the washer 36 by a mixing blade or agitator 32. A screw separator 38 is rotated by a motor 46 and moves the sand upward along a wall of the washer 36 and out of the wash solution. The washed sand 34 falls through an outlet and onto a conveyor 35, which is supported by rollers 37. The conveyor 35 moves the washed sand 34 into either a drying process or directly into the microwaving process. The attrition process is further described above and with reference to FIG. 2 and Example 1.

Figure 10:
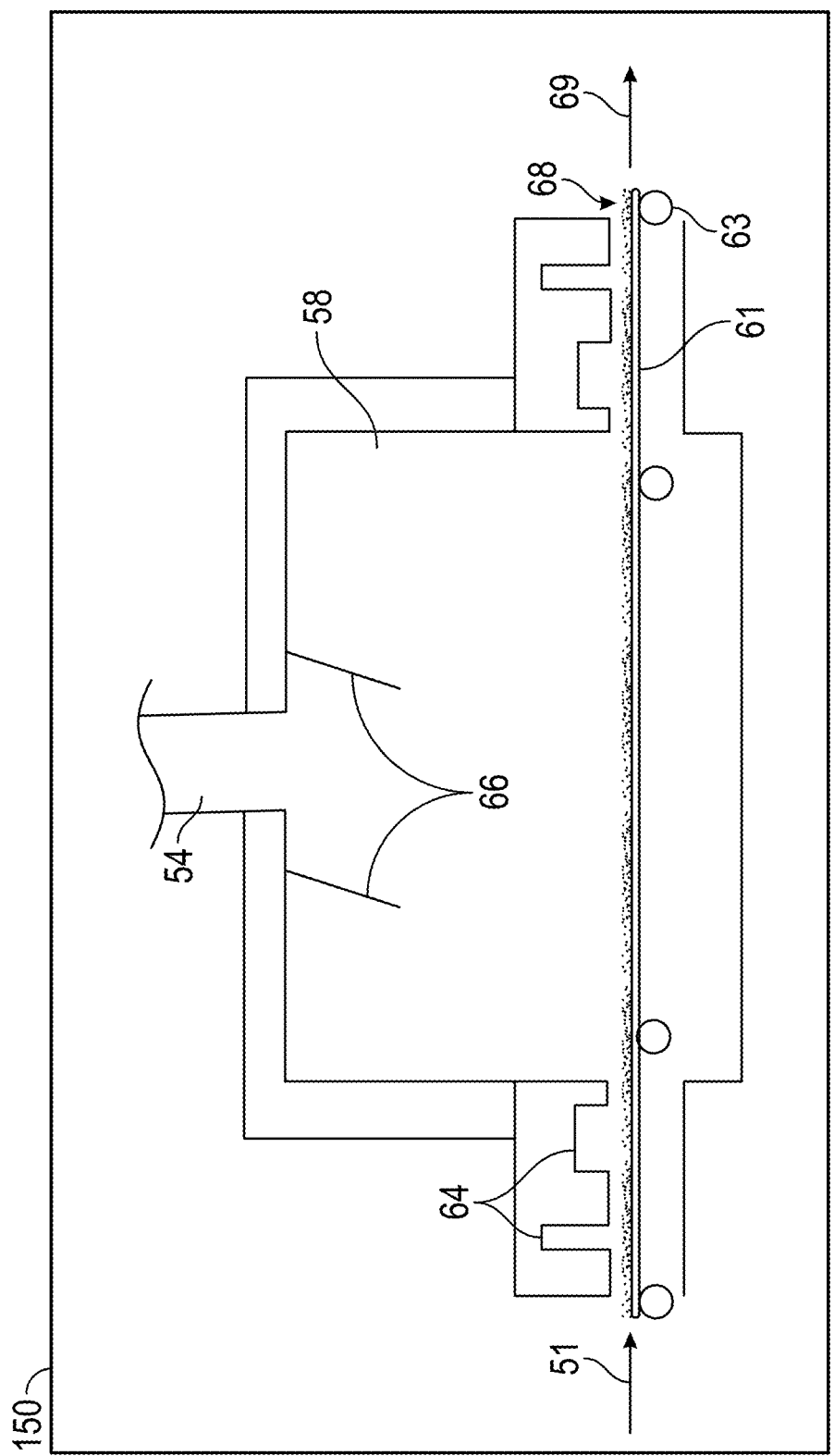
FIG. 10 is a schematic flow diagram illustrating an embodiment of the microwaving process of FIGS. 8A and 8B.

FIG. 10 is a schematic flow diagram illustrating an embodiment of the microwaving process that is represented by block 150 of FIGS. 8A and 8B. As illustrated, washed sand from block 130 (see FIG. 9) or from a drying process (see FIG. 8A or 8B) enters the process at 51 via a conveyor 61 supported by conveyor supports 63. The washed sand enters the heating chamber or applicator 58 via the conveyor 61, which moves the washed sand at slow rate so that each sand grain remains within the heating chamber or applicator 58 and is exposed to the microwave electromagnetic radiation emitted from the waveguide 54 for a preselected microwave exposure time, e.g., between about 3 and about 5 minutes. Mode stirrers 66 are shown movably coupled to a top portion of the inner chamber 58 and function to modify the electromagnetic boundary conditions within the heating chamber or applicator 58, which results in a temporal non-stationary electric field pattern over the washed sand on conveyor 61. Chokes 64 are also shown proximate to where the conveyor 61 enters and leaves the heating chamber or applicator 58. Chokes 64 are arranged and act to minimize microwave electromagnetic radiation leakage from inside the heating chamber or applicator 58. The microwave-treated sand 68 exits the heating chamber or applicator 58 via conveyor 61 at 69. The microwaving process is further described above and with reference to FIGS. 3 and 4 and Example 2.

Figure 11:
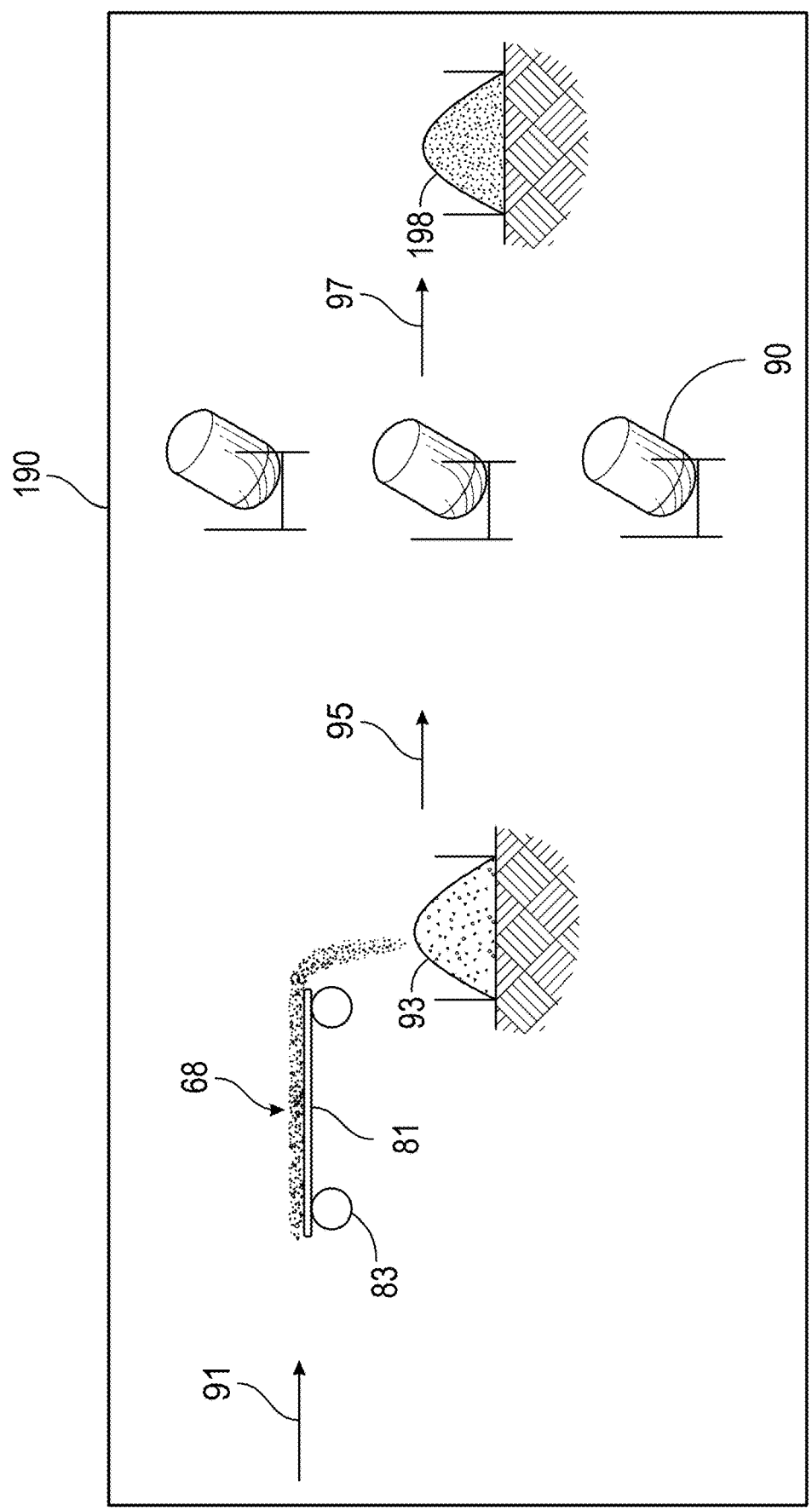
FIG. 11 is a schematic flow diagram illustrating an embodiment of the tumbling process of FIGS. 8A and 8B.

FIG. 11 is a schematic flow diagram illustrating an embodiment of the tumbling process that is represented by block 190 of FIGS. 8A and 8B. As illustrated, microwave-treated sand 68 enters the process at 91 via a conveyor 81 supported by conveyor supports 83. The sand 68 is offloaded into a holding container 93. Sand 68 from the holding container 93 may then be placed into one of a plurality of mixers or tumblers 90. Alternatively, the sand 68 may be offloaded directly into one of a plurality of mixers or tumblers 90. In one or more embodiments, the number of mixers or tumblers 90 is selected such that one mixer or tumbler 90 is being emptied of sand as another is being filled with sand. The number of mixers or tumbler needed for such semi-continuous operation is dependent on the desired mixing/tumbling time of the tumbling process, as will be understood by those skilled in the art. Once the sand has tumbled for the desired period of time, the finished sand 198 is offloaded into a storage or other container for use as sand proppant. The tumbling process is further described above and with reference to FIGS. 6, 7A, and 7B.

Figure 12:
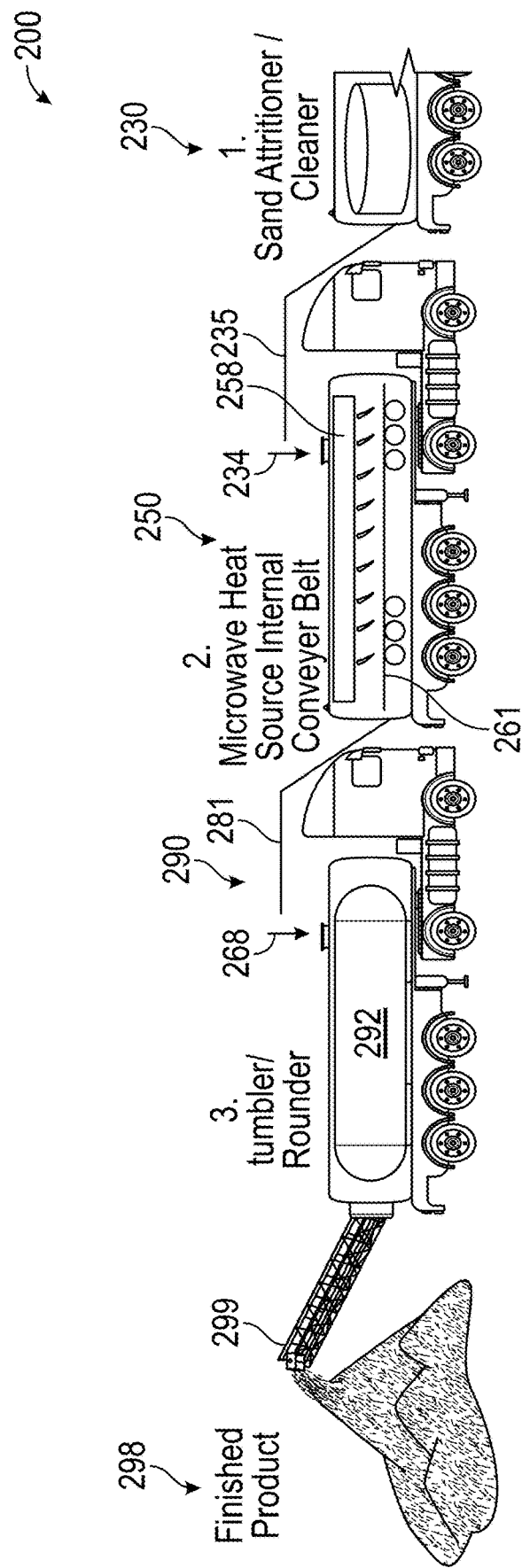
FIG. 12 is a schematic diagram of an attrition process, a microwaving process, and a tumbling process according to one or more embodiments of the disclosure further having a mobile or at least semi-mobile arrangement.

FIG. 12 is a schematic representation of the attrition process 230, the microwaving process 250 and the tumbling process 290 according to one or more embodiments of the disclosure further having a mobile or at least semi-mobile arrangement 200. In this embodiment, for example, a mobile sand attritioning and/or cleaning process 230 is provided as illustrated in a mobile trailer or mobile tank, a microwave or heating process 250 is provided as illustrated in a mobile trailer or mobile tank (connected to a tractor), and a tumbling process 290 is provided by a mobile trailer or mobile tank (connected to a tractor). The sand treated in the mobile sand attritioning process 230 may be conveyed via mobile conveyor 235 to an inlet 234 of the mobile trailer or mobile tank providing the microwave or heating process 250. The sand treated in the mobile microwave or heating process 250 may be conveyed via mobile conveyor 231 to an inlet 268 of mobile trailer or mobile tank providing the tumbling process 290. The treated sand 298 may then be conveyed to sand stacks, sand unloading or piling areas, or a sand storage facility or location by a conveyor 299 or other transporting source as will be understood by those skilled in the art. The mobile trailers or tanks illustrated, as will be understood by those skilled in the art, may include machines positioned within or on a trailer and/or tank to include an attritioner 236, a microwave heater 258, a microwave conveyor 261 and/or a tumbler 292. This, for example, may allow the process to be positioned close to a rail spur or rail terminal located near a specific formation. The mobile or semi-mobile arrangement 200 then can be more readily moved to another location where desired. Other locations, such as near a well fracturing site or in a region where a plurality of well fracturing sites are located, also may be used as will be understood by those skilled in the art to reduce transportation distances of the treated proppant or sand to a well fracturing or other site for usage, for example.

This application is a continuation, and claims priority to and the benefit of U.S. Non-Provisional patent application Ser. No. 16/276,910, filed Feb. 15, 2019, titled "SYSTEMS AND METHODS TO STRENGTHEN SAND PROPPANT," which is a divisional of U.S. Non-Provisional Patent application Ser. No. 16/144,654, filed Sep. 27, 2018, titled "SYSTEMS AND METHODS TO STRENGTHEN SAND PROPPANT," now U.S. Pat. No. 10,364,154, issued Jul. 30, 2019, which claims priority to and the benefit of U.S.

Provisional Patent Application No. 62/690,073, filed Jun. 26, 2018, titled "SYSTEMS AND METHODS TO STRENGTHEN SAND PROPPANT," the full disclosure of which is hereby incorporated herein by reference in its entirety.

In the drawings and specification, several embodiments of systems and methods to strengthen sand proppant have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

What is claimed is:

1. A method of increasing crush resistance of silica sand proppant used in fracturing operations involving one or more subterranean hydrocarbon formations, the method comprising:
    washing silica sand proppant in a washer to remove impurities;
    exposing at least a portion of the washed silica sand proppant to electromagnetic radiation to impart heat to the washed silica sand proppant, the electromagnetic radiation being generated by a local electromagnetic radiation source;
    adding washed and exposed silica sand proppant to a tumbler; and
    within about one minute after the at least a portion of the washed silica sand proppant has been exposed to the electromagnetic radiation, tumbling the at least a portion of washed silica sand proppant in the tumbler.

2. The method of claim 1, further comprising:
    supplying the washed and exposed silica sand proppant, after tumbling, to a well fracturing site for use in the fracturing operations involving one or more subterranean hydrocarbon formations.

3. The method of claim 1, wherein tumbling the at least a portion of washed silica sand proppant in the tumbler occurs within about thirty seconds after that portion was exposed to the electromagnetic radiation.

4. The method of claim 1, wherein the tumbling occurs for at least about five minutes.

5. The method of claim 1, further comprising:
    contacting the silica sand proppant to an acidic solution in the washer.

6. The method of claim 5, wherein the acidic solution in the washer also contains an organic removal agent.

7. The method of claim 1, further comprising:
    contacting the silica sand proppant to an ammonium chloride solution in the washer.

8. The method of claim 1, wherein exposing the at least a portion of the washed silica sand proppant to the electromagnetic radiation further comprises:
    placing the at least a portion of the washed silica sand proppant on a conveyor; and
    operating the conveyor to pass the at least a portion of the washed silica sand proppant thereon through a heating chamber into which the local electromagnetic radiation source emits the electromagnetic radiation.

9. The method of claim 1, wherein the electromagnetic radiation generated by the local electromagnetic radiation source has a frequency between about 1200 MHz and about 2700 MHz.

10. The method of claim 9, wherein the at least a portion of the washed silica sand proppant is exposed to the electromagnetic radiation for no more than about three minutes.

11. The method of claim 1, wherein the silica sand proppant washed in the washer has been sorted to have a preselected particle size range prior to washing.

12. A method of increasing crush resistance and fracture conductivity of silica sand proppant used in fracturing operations involving one or more hydrocarbon formations, the method comprising:
    washing silica sand proppant in a washer to remove impurities from the silica sand proppant; and
    exposing at least a portion of the washed silica sand proppant to electromagnetic radiation prior to injection into a hydrocarbon well for the fracturing operations, the electromagnetic radiation being generated by a local electromagnetic radiation source.

13. The method of claim 12, further comprising:
    supplying the washed and exposed silica sand proppant to a well fracturing site for use in the fracturing operations involving one or more hydrocarbon formations.

14. The method of claim 12, further comprising:
    contacting the silica sand proppant to an acidic solution in the washer.

15. The method of claim 12, further comprising:
    contacting the silica sand proppant to an ammonium chloride solution in the washer.

16. The method of claim 12, further comprising:
    contacting the silica sand proppant to an organic removal agent in the washer.

17. The method of claim 12, wherein exposing the at least a portion of the washed silica sand proppant to the electromagnetic radiation further comprises:
    placing the at least a portion of the washed silica sand proppant on a conveyor; and
    operating the conveyor to pass the at least a portion of the washed silica sand proppant thereon through a first suppression tunnel, a heating chamber and then a second suppression tunnel, the electromagnetic radiation emitted by the local electromagnetic radiation source into the heating chamber, the first and second suppression tunnels positioned to reduce electromagnetic radiation leakage from the heating chamber.

18. The method of claim 12, wherein the electromagnetic radiation generated by the local electromagnetic radiation source has a frequency between about 1200 MHz and about 2700 MHz.

19. The method of claim 18, wherein the at least a portion of the washed silica sand proppant is exposed to the electromagnetic radiation for no more than about three minutes.

20. The method of claim 12, wherein the silica sand proppant washed in the washer has a particle size range of about 20/40 mesh.

* * * * *